United States Patent [19]
Hobbs et al.

[11] Patent Number: 5,197,138
[45] Date of Patent: Mar. 23, 1993

[54] REPORTING DELAYED COPROCESSOR EXCEPTIONS TO CODE THREADS HAVING CAUSED THE EXCEPTIONS BY SAVING AND RESTORING EXCEPTION STATE DURING CODE THREAD SWITCHING

[75] Inventors: Steven O. Hobbs, Westford, Mass.; Hai Huang, Nashua, N.H.

[73] Assignee: Digital Equipment Corporation, Maynard, Mass.

[21] Appl. No.: 457,144

[22] Filed: Dec. 26, 1989

[51] Int. Cl.$^5$ .......................... G06F 9/00; G06F 9/46; G06F 15/16; G06F 15/347
[52] U.S. Cl. ................................. 395/375; 395/800; 364/931.49; 364/931.51; 364/931.52; 364/941; 364/946.2; 364/DIG. 2
[58] Field of Search .............................. 395/375, 800

[56] References Cited

U.S. PATENT DOCUMENTS

| | | | |
|---|---|---|---|
| 3,614,740 | 10/1971 | Delagi | 340/172.5 |
| 4,247,984 | 1/1981 | Beismann et al. | 364/200 |
| 4,258,420 | 3/1981 | Negi et al. | 364/200 |
| 4,385,365 | 5/1983 | Hashimoto et al. | 364/900 |
| 4,547,849 | 10/1985 | Louie et al. | 364/200 |
| 4,656,578 | 4/1987 | Chilinski et al. | 364/200 |
| 4,758,978 | 7/1988 | Cruess et al. | 364/900 |
| 4,766,566 | 8/1988 | Chuang | 395/375 |
| 4,777,593 | 10/1988 | Yoshida | 364/200 |
| 4,780,811 | 10/1988 | Aoyama et al. | 395/800 |
| 4,835,685 | 5/1989 | Kun | 364/200 |
| 4,890,220 | 12/1989 | Nakagawa et al. | 395/800 |
| 4,914,578 | 4/1990 | MacGregor et al. | 395/375 |
| 4,942,519 | 7/1990 | Nakayama | 395/775 |
| 4,974,145 | 11/1990 | Aoyama et al. | 395/800 |
| 5,021,991 | 6/1991 | MacGregor et al. | 395/650 |

OTHER PUBLICATIONS

PDP11 04/34/45/55 Processor Handbook, Digital Equipment Corporation, 1976.
G. Kane, MIPS R2000 RISC Architecture, MIPS Computer Systems, Inc., 1987.

*Primary Examiner*—Thomas C. Lee
*Assistant Examiner*—Alpesh M. Shah
*Attorney, Agent, or Firm*—Arnold, White & Durkee

[57] ABSTRACT

Save-Exception-State and Restore-Exception-State primitives are defined in the operating system and are used to confine the reporting of delayed asynchronous coprocessor exceptions to the respective code threads that generate the exceptions. The Save-Exception-State primitive saves the coprocessor exception state pertinent to the currently executed code thread, and the Restore-Exception-State primitive restores a selected one of the exception states having been saved. The Save-Exception-State primitive synchronizes the coprocessor, disables use of the coprocessor, saves any pending coprocessor exception state into memory, and clears the coprocessor exception state information from the coprocessor or a "thread descriptor" area of memory allocated to the current code thread. The Restore-Exception-State primitive synchronizes the coprocessor, disables use of the coprocessor, reports any pending exceptions in the coprocessor, and restores the saved exception state into a respective code thread descriptor in memory allocated to the code thread having generated the saved exception state information. The restored exception state is reported by a "Coprocessor-Disabled" exception handler that checks for any exceptions pending in the coprocessor or thread descriptor, when necessary stores the coprocessor state information from the process which last executed a coprocessor instruction, when necessary retrieves the coprocessor state information for the current process, reports any pending exceptions, and reenables use of the coprocessor.

25 Claims, 11 Drawing Sheets

REPORTING DELAYED COPROCESSOR EXCEPTIONS TO CODE THREADS HAVING CAUSED THE EXCEPTIONS BY SAVING AND RESTORING EXCEPTION STATE DURING CODE THREAD SWITCHING

RELATED APPLICATIONS

This application is related to U.S. patent application Ser. No. 07/170,393, filed Mar. 18, 1988 now U.S. Pat. No. 5,043,867 issued Aug. 27, 1991, entitled Exception Reporting Mechanism for a Vector Processor, by Dileep Bhandarkar et al.; U.S. patent application Ser. No. 07/170,399, filed Mar. 18, 1988 now U.S. Pat. No. 5,008,812 issued Apr. 16, 1991, entitled Context Switching Method and Apparatus for Use in a Vector Processing System, by D. Bhandarkar et al.; U.S. patent application Ser. No. 07/170,395, filed Mar. 18, 1988 now U.S. Pat. No. 4,949,250 issued Aug. 14, 1990, entitled Method and Apparatus for Executing Instructions for a Vector Processing System, by D. Bhandarkar et al.; and U.S. patent application Ser. No. 07/170,367, filed Mar. 8, 1988 now U.S. Pat. No. 5,113,521 issued May 12, 1992, entitled Method and Apparatus for Handling Asynchronous Memory Management Exceptions by a Vector Processor, by F. McKeen et al.; which are herein. incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to digital computers, and more particularly to the handling of exceptional conditions that arise from the execution of instructions and cause the normal sequence of instruction execution to be interrupted. In particular the invention concerns the handling of exceptions that are delayed by a variable amount of time so that they are asynchronous to instruction execution.

BACKGROUND OF THE INVENTION

A conventional digital computer executes tasks which typically consist of respective sequences of related instructions that are executed to access or modify the contents of a set of registers and memory cells. Each respective sequence will be referred to as a "code thread". In a code thread, the instructions are executed sequentially, one after the other, unless jumps or branches are caused by jump or branch instructions. This usual flow of control in a first "code thread" is often changed by writing in memory the contents of the registers and then executing a second code thread. Since the contents of the registers are saved in memory, execution of the first code thread can be resumed at the point of interruption after the registers are loaded with the contents that were saved in memory. In this fashion, the registers are restored to reestablish the "context" of the first code thread, and the two code threads therefore can be executed independently of each other. This process of saving and restoring the contexts of code threads can be controlled by a master program known as an "operating system" to share a computer among the programs of a number of tasks.

Conventional digital computers include a mechanism to permit an external event asynchronous to instruction execution to change the flow of control. This external event is referred to as an "interrupt". When an interrupt occurs, the processor permits execution of the current instruction to complete, automatically writes in memory the contents of the registers, including the program counter, and then begins instruction execution at a predetermined address referred to as the "interrupt vector". An input/output (I/O) device typically generates such an interrupt signal to cause an I/O service routine to be executed. The service routine typically ends with a "return from interrupt" instruction that causes the registers, including the program counter, to be restored with the contents that were saved in memory, and causes the interrupted flow of control to resume.

The usual flow of control can also be changed by an unusual condition resulting from the execution of an instruction. These unusual conditions are called "exceptions". An exception that occurs after the end of an instruction is called a "trap". An "arithmetic trap", for example, occurs at the end of a divide instruction when a divide by zero is attempted. The operating system typically has an error handler routine that is executed in response to arithmetic traps. A trap can also be explicitly called for by a "software interrupt" instruction that causes the contents of the registers, including the program counter, to be stored in memory, and then begins instruction execution at a specified address.

Another kind of exception, known as a "fault", arises before the completion of an instruction. In response to the fault, the register values are saved in memory, and a "fault handler" routine of the operating system is executed. If the "fault handler" can correct the condition, the registers are restored and execution of the instruction is restarted. If the condition cannot be cleared, the exception is called an "abort".

Many computers include registers that indicate condition codes or report pending interrupts. A computer system, for example, may include a number of I/O units, all of which are serviced by the same interrupt routine. The interrupt routine usually begins by polling the registers that specify which I/O unit needs to be serviced. In more complex computer systems, the hardware automatically prioritizes similar interrupts and causes a respective interrupt routine to be executed for each interrupt. These more complex systems usually include registers which permit respective priorities to be assigned to various interrupts and also permit a priority to be assigned to the program or code thread currently being executed by the processor. An interrupt will not be recognized or serviced by the processor until the priority of the code thread is lower than the priority of the interrupt.

By providing special hardware that automatically recognizes exceptions and interrupts, the software does not have to constantly check for special conditions, completions of the device operations, or erroneous arithmetic results. Instead, the hardware automatically reports the occurrence and prioritizes its servicing. Through the use of exception and interrupt vectors, the action to take for each condition can be specified in advance.

In a timesharing system, it is desirable to suspend the execution of a first code thread for a first user to execute a second code thread for a second user when the first code thread is waiting for data requested from an I/O device. Usually this is done by lowering the priority of the first code thread after an I/O request. But it is also necessary to provide a mechanism for passing the data from the I/O device back to the first code thread. One way of doing this is by defining an "Asynchronous System Trap" (AST) for the first code thread. An AST is a call of a routine within the context of a code thread, that is asynchronous to the execution of the code thread. Before issuing an I/O request, the first code thread, for example, specifies a routine to be called when the requested I/O is completed. This routine is called an Asynchronous System Trap routine, because it is called when an asynchronous event occurs. If the first code thread is executing when the event occurs, it will be interrupted and the AST routine will be called. When the AST routine returns, program execution continues from the interrupted point. In any event, the AST routine is within the context of the first code thread, so that the AST routine can pass data to the first code thread simply by executing an instruction that modifies the contents of a register.

When the I/O device is ready to respond to the I/O request, it issues an interrupt signal to the processor. Therefore, to define the AST, a linkage must be set up between the interrupt routine of the I/O device and the context of the first code thread associated with the AST. In other words, before requesting the I/O operation, the first code thread must enable the interrupt routine for the I/O device to call the AST routine, and before the AST routine is executed, the registers must be loaded with the context of the first code thread associated with the AST. The linkage between the interrupt routine of the I/O device and the AST routine, for example, is defined by an entry in a respective queue of AST routine addresses associated with the I/O device to permit a number of I/O requests from different code threads to be pending at any given time.

In a timesharing system, the AST could be called when the I/O interrupt occurs to interrupt the execution of any code thread currently being executed. But if a code thread other than the one associated with the interrupt it being executed, it is preferable to delay the calling of the AST routine until the operating system permits the first code thread to be executed. At that later time the operating system enables the servicing of the interrupt routine for the I/O device, the restoring of the registers with the context of the first code thread, and the calling of the AST routine.

Asynchronous exceptions also arise when specialized functional units are implemented as coprocessors. The coprocessor can operate either synchronously or asynchronously with respect to the main processor which issues instructions to the coprocessor. For asynchronous execution, the coprocessor can execute an issued instruction simultaneously while the main processor executes further instructions. But during synchronous execution, after the main processor issues an instruction to the coprocessor, the main processor does not process any further instructions until the issued instruction is guaranteed to complete, without causing an exception.

An example of asynchronous execution is the Digital Equipment Corporation's PDP-11/45 and PDP-11/55 FP11-C Floating Point Processor which is described in the PDP11 04/34/45/55 Processor Handbook, Digital Equipment Corporation, 1976. Overlapped operation of the FP11-C and a central processor is implemented as follows. When a FP11-C instruction is fetched from memory the FP11-C will execute that instruction in parallel with the central processor continuing its instruction sequence. The central processor is delayed a very short period of time during the FP11-C instruction fetch operation, and then is free to proceed independently of the FP11-C. The interaction between the two processors is automatic, and a program can take full advantage of the parallel operation of the two processors by intermixing floating point processor and central processor instructions.

When an FP11-C instruction is encountered in a program, the central processor first initiates floating point handshaking and calculates the address of the operand. It then checks the status of the floating point processor. If the FP11-C is "busy", the central processor will wait until the FP11-C is "done" before continuing execution of the program.

One interrupt vector is assigned to take care of all of the FP11-C floating point exceptions. Seven errors are possible and they are coded in a four bit "floating exception code" register (FEC) as follows: floating OP-code error (FEC=2); floating divide by zero (FEC=4); floating (or double) to integer conversion error (FEC=6); floating overflow (FEC=8); floating underflow (FEC=10); floating undefined variable (FEC=12); and maintenance trap (FEC=14). The address of the instruction producing the exception is stored in a "floating exception address" (FEA) register. The operating system handles the floating point exception by extracting the FEC and FEA registers, and delivering a "floating point processor exception" AST to the task.

An example of synchronous execution is one operating mode of the MIPS R2000 data processing system described in a reference manual by Gerry Kane entitled *MIPS R2000 RISC Architecture*, MIPS Computer Systems, Inc., 1987. In this case the data processing system includes a main processor and a floating-point coprocessor. The floating-point coprocessor has a Control/Status register that contains control data and status data. (See page 6-5.) The control data controls the rounding of arithmetic results and enabling of exceptions. The status data indicates exceptions that occurred in the most recently executed instruction, and all exceptions that have occurred since the Control/Status register was cleared.

On page 8-10 of the *MIPS R2000 RISC Architecture* reference manual, it is said that thirty-two coprocessor load or store instructions will save the floating-point coprocessor's floating-point state in memory. The contents of the Control/Status register can be saved using the "move to/from coprocessor control register" instructions (CTC1/CFC1). Normally, the Control/Status register contents are saved first and restored last. The "exceptions" field of the Control/Status register holds the results of only one instruction: the floating-point coprocessor examines the source operands before an operation is initiated to determine if the instruction can possibly cause an exception. If an exception is possible, the floating-point coprocessor executes the instruction in "stall" mode to ensure that no more than one instruction at a time is executed that might cause an exception. All bits in the "exceptions" field can be cleared by writing a zero to this field. This permits restarting of normal processing after the Control/Status register state is restored.

Another example of synchronous execution is the operation of the IBM System/370 vector facility. The vector instructions are executed sequentially, and any exceptions encountered during execution of the instructions are recognized sequentially. Only one exception at a time is allowed to cause an interruption. At the point of interruption, all preceding vector element operations have been completed successfully, and any subsequent operations that have already been performed are discarded as though they have not yet occurred.

Synchronous operation avoids the problem of delayed exceptions, but at the expense of decreasing the overall system performance. With asynchronous operation, the main processor does not need to delay or suspend its current execution of instructions unless the instruction is to synchronize with the coprocessor.

In short, asynchronous execution of the coprocessor operations vis-a-vis the main processor can greatly improve the overall performance of the system. Asynchronous execution of the coprocessor, however, causes reporting of coprocessor exceptions to the user program to be delayed by an imprecise amount of time. Delayed exceptions present a problem to the execution of multiple code threads within a process. An exception condition generated by one code thread may be reported during an unrelated code thread, making fault isolation difficult.

SUMMARY OF THE INVENTION

Accordingly, the present invention is directed to confining the reporting of a delayed coprocessor exception to the code thread including the code that generates the exception. This problem is solved by save-exception-state and restore-exception-state primitives in the operating system that operate in a novel fashion in conjunction with a "Coprocessor Disabled" exception routine and the saving and restoring of exception state information into respective code thread descriptors maintained by the operating system. The Save-Exception-State primitive saves the coprocessor exception state pertinent to the currently executing code thread, and the Restore-Exception-State primitive restores a selected one of the exception states having been saved.

The Save-Exception-State primitive synchronizes the coprocessor, disables use of the coprocessor, saves any pending coprocessor exception state into memory, and then clears the coprocessor exception state information from the coprocessor or from an operating system maintained thread descriptor allocated to the current code thread.

The Restore-Exception-State primitive synchronizes the coprocessor, disables use of the coprocessor, reports any pending exceptions in the coprocessor, and restores the exception state into a respective operating system maintained thread descriptor in memory allocated to the code thread having generated the saved exception state. The restored exception state is reported by the "Coprocessor-Disabled" exception handler that checks for any exceptions pending in the coprocessor or thread descriptor, when necessary stores the coprocessor state information from the process which last executed a coprocessor instruction, when necessary retrieves the coprocessor state information for the current process, reports any pending exceptions, and reenables use of the coprocessor. In the usual case the Save-Exception-State and Restore-Exception-State primitives are used in a single process, so that the "Coprocessor-Disabled" exception handler need not save and restore the coprocessor state information.

The Save-Exception-State and Restore-Exception-State primitives therefore permit user trap or interrupt routines to save and restore the exception state of the coprocessor, use the processor, and return to the mainline code with the vector exception intact.

BRIEF DESCRIPTION OF THE DRAWINGS

Other objects and advantages of the invention will become apparent upon reading the following detailed description and upon reference to the drawings in which.

Figure 1:
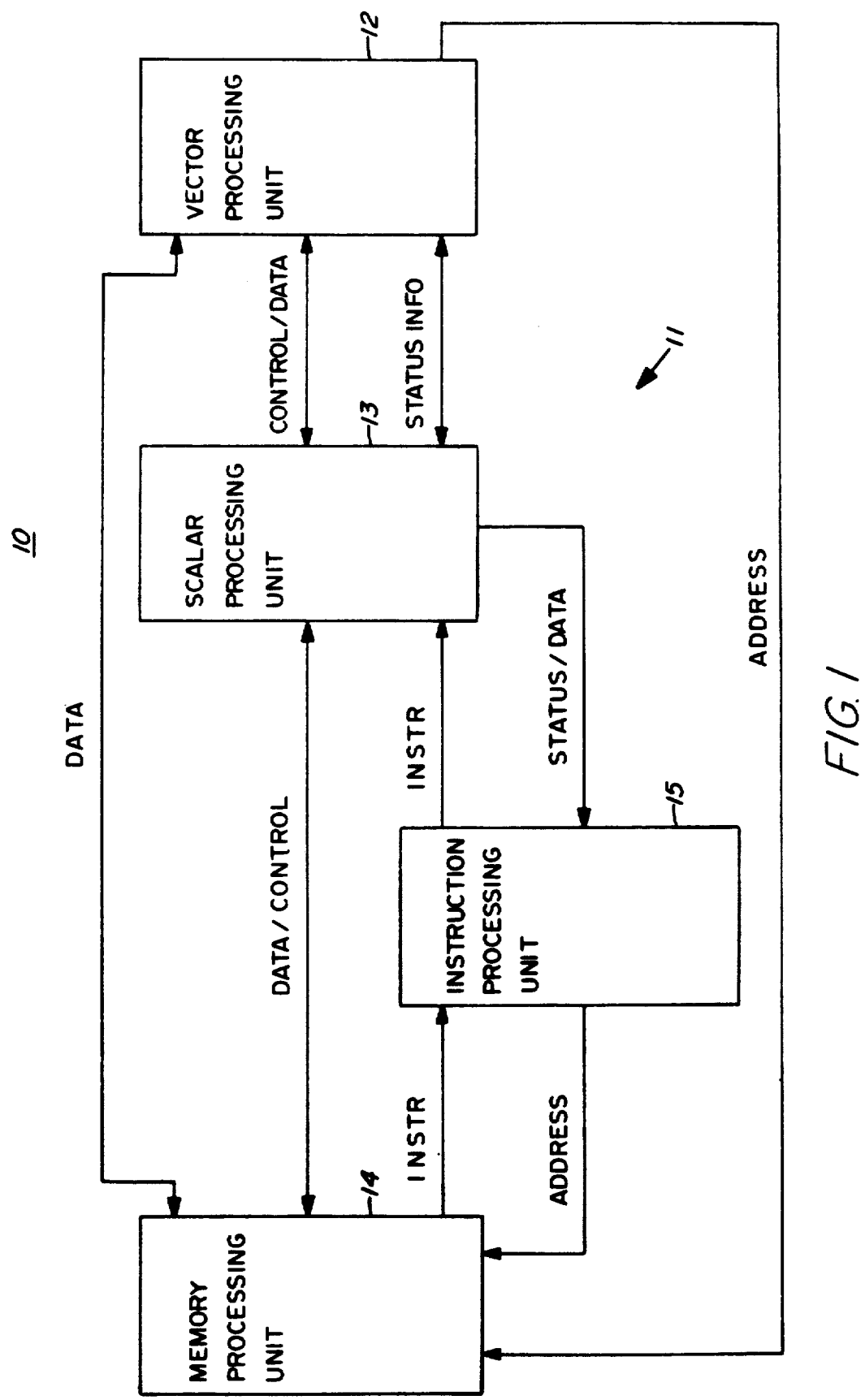
FIG. 1 is a block diagram of a data processing system in which the present invention is advantageously employed.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, there is shown in FIG. 1 a data processing system 10 in which the present invention is particularly advantageous. The data processing system includes a main processor 11 and a coprocessor 12. In particular, the main processor 11 is a scalar processor, and the coprocessor 12 is a vector processor. The scalar processor includes a scalar processing unit (SPU) 13 and an instruction processing unit (IPU) 15. The vector processor 12 is a vector processing unit (VPU). The SPU, IPU and VPU share a memory processing unit 14.

In operation, the data processing system provides a means for executing an instruction stream including intermixed scalar and vector instructions. The instruction processing unit 15 fetches the instructions from the memory processing unit 14. Scalar instructions are passed on to the scalar processing unit 13 and the vector instructions are passed on to the vector processing unit 12.

In the particular embodiment, the SPU 13 receives all of the instructions from the IPU 15, executes the scalar instructions, and sends the vector instructions and vector data from the IPU 15 to the VPU 12. The VPU 12 executes vector instructions simultaneously with the execution of scalar instructions by the SPU 13. The memory processing unit 14 receives control, address and data signals from IPU 15, SPU 13 and VPU 12, and then arbitrates and responds to those signals.

Figure 2:
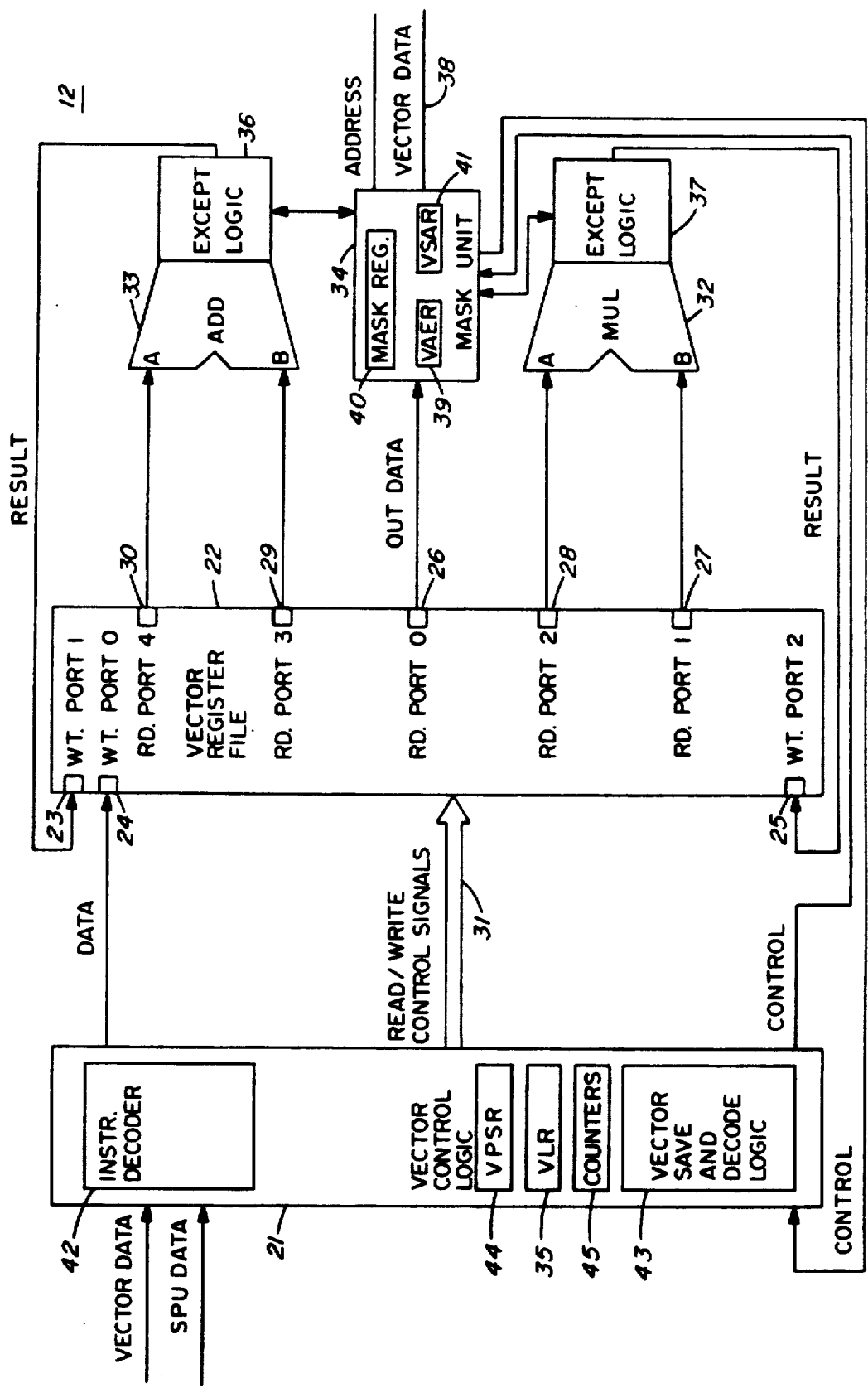
FIG. 2 is a schematic diagram of a vector processing unit (VPU) that is used in the data processing system of FIG. 1.

FIG. 2 shows the preferred construction of the vector processing unit 12. As shown in FIG. 2, the VPU 12 includes control logic 21 as the main interface with other parts of the data processing system (10 in FIG. 1) and a vector register file 22 for servicing vector data access requests. Such requests can either be write requests composed of write control signals and write addresses, or read requests composed of read control signals and read addresses. Vector register file 22 contains a plurality of write ports, shown as WT PORT-0-WT PORT2 and denoted by reference numbers 23-25, as well as a plurality of read ports, shown as RD PORT0 -RD PORT4 and denoted by the reference numbers 26-30. The write ports receive READ/WRITE control signals 31 and write data from the vector control logic 21, from a vector multiplier 32, or from a vector adder 33.

The read ports operate similarly to the write ports. Read port RD PORT0 26, for example, receives a read enable signal, a vector register select signal, and vector element address signals from control logic 21 via READ/WRITE control signal bus 31. The output data from read port RD PORT0 26 is fed to a mask unit 34. The other read ports also receive their control and address signals from control logic 21. The outputs from RD PORT1 27 and RD PORT2 28 are connected to vector multiplier 32, and the outputs from read ports 29 and 30 are connected to vector adder 33.

The vector register file 22 includes a plurality of vector registers which store vectors processed by the VPU 12. The vector register file 22, for example, has sixteen vector registers and each vector register has sixty-four elements.

The number of entries of the vector being processed, i.e., the length of that vector, is stored in a vector length register (VLR) 35 in the control logic 21. For handling vectors having up to sixty-four elements, for example, the vector length register 35 is 7-bits long to represent vector lengths from 0 to 64 elements.

The vector adder 33 performs integer and floating point add and subtract operations on two vectors supplied from the vector register file 22 via RD PORT3 29 and RD PORT4 30. Preferably adder 33 also performs certain logical and shift operations. The output of the vector adder 33, labeled "RESULT," provides a data input to WT PORT1 23. The vector adder 33 also includes exception logic 36 coupled to the mask unit 34 which permits the adder 33 to perform operations upon condition and to advise the mask unit 34 of arithmetic exception conditions. The vector multiplier 32 performs integer and floating point multiplication and division operations on two vectors received from RD PORT1 27 and RD PORT2 28 of vector register file 22. The product or quotient of those inputs is a vector also labeled "RESULT" and is provided as input data to WT PORT2 25. Exception logic 37, which is coupled to the mask unit 34, indicates to the mask unit when there is an arithmetic exception condition resulting from the multiplication or division by the multiplier 32.

The mask unit 34 receives data from the vector register file 22 via RD PORT0 26 and provides vector data from the VPU 12 to the SPU (13 in FIG. 1) via the VECTOR DATA line 38. The mask unit 34 also can read the data from RD PORT0 26 and convert it to an address for the memory processing unit (14 in FIG. 1). In addition, the mask unit 34 is coupled to exception logic 36 and 37 and latches their exceptions into a register 39 referred to as the Vector Arithmetic Exception Register (VAER). The VAER can be read by the SPU (13 in FIG. 1).

Also contained in the mask unit 34 is a vector mask register 40 having, for example, 64 bits, each of which corresponds to a different one of the vector elements in a given vector register and indicates whether the corresponding vector element is enabled and should be processed. The vector mask register 40 can be loaded by the SPU (13 in FIG. 1). Preferably, the vector mask register 40 ensures that only the results from the enabled elements in a vector register will be stored.

The mask unit 34 further includes a vector state address register (VSAR) 41 which may hold an address from which the specific vector state information can be reloaded from memory for asynchronous handling of memory management exceptions.

The vector control logic 21 includes an instruction decoder 42 for decoding instructions, and vector save and decode logic 43 for scheduling all activity in the VPU 12. The vector control logic 21 also includes a vector processor status register (VPSR) 44 that holds information representing the execution state of the VPU 12. In addition, the vector control logic 21 has a bank of counters 45 which includes a respective counter associated with each of the vector registers in the vector register file 22 for providing an address for the associated vector elements in the associated vector register.

Figure 3:
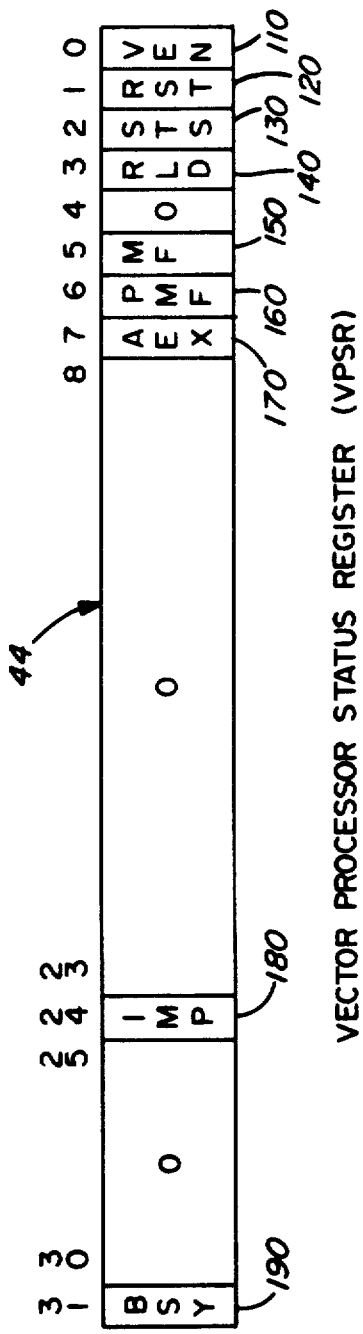
FIG. 3 is a diagram showing the preferred organization of a vector processor status register (VPSR) used in the vector processor of FIG. 2.

Turning now to FIG. 3, there is shown a preferred organization of the Vector Processor Status Register (VPSR) 44. As shown, the VPSR 44 holds 32 bits of the status information representing the execution state of the VPU 12.

Bit zero of the VPSR 44 is a vector processor enable (VEN) bit 110 which indicates whether the VPU 12 is disabled. The VPU 12 is enabled by writing a 1 to this bit and disabled by writing a 0 to this bit. When the VPU 12 is disabled, any attempt by the SPU 13 to send vector instructions to the VPU 30 results in a Vector Processor Disabled Fault.

Bit one of the VPSR 44 is a vector processor state reset (RST) bit 120. Writing a one to this bit clears the VPSR 44 and the VAER 39.

Bit two of the VPSR 44 is vector state store (STS) bit 130 which, if set to a one, initiates the storing of vector state information to the memory processing unit 14 using a virtual memory address in the VSAR 41 for asynchronous handling of memory management exceptions. If synchronous handling of memory management exceptions is implemented, STS bit 230 is ignored.

Bit three of the VPSR 44 is a vector state reload (RLD) bit 140 which, if set to one, initiates reloading of vector state information from memory using the memory address in the VSAR 41 for asynchronous handling of memory management exceptions. As with bit 130, if synchronous handling of memory management exceptions is implemented, the RLD bit 140 is ignored.

Bit five of the VPSR 44 is a memory fault (MF) bit 150 which is set to a one by the VPU 12 to indicate the presence of a memory reference to be re-executed due to an asynchronous memory management exception. If synchronous handling of memory management exceptions is implemented, this bit is always zero.

Bit six of the VPSR 44 is a pending memory fault (PMF) bit 160. The VPU 12 sets the PMF bit 160 to a one to indicate that an asynchronous memory management exception is pending. If synchronous handling of memory management exceptions is implemented, this bit is always zero.

Bit seven of the VPSR 44 is an arithmetic exception (AEX) bit 170 which is normally zero to indicate that the VPU 12 is not disabled by certain arithmetic exceptions, such as a floating underflow or integer overflow. The VPU always sets this bit when an arithmetic exception occurs. Information regarding the specific nature of the exception is located in the VAER 39.

Bit twenty-four of the VPSR 44 is a hardware error (IMP) bit 180. The IMP bit 180 is set to one when the VPU 30 is disabled due to a hardware error.

Bit thirty-one of the VPSR 44 is a vector processor busy (BSY) bit 190 which the VPU 12 sets to one when it is executing vector instructions. When this bit is cleared to zero, the VPU 12 is idle or has suspended instruction execution due to an asynchronous memory management exception.

Figure 4:
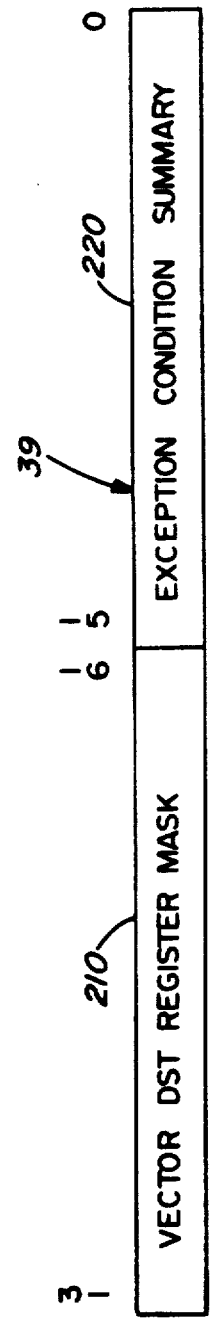
FIG. 4 is a diagram showing the preferred organization of a vector arithmetic exception register (VAER) used in the vector processor of FIG. 2.

Turning now to FIG. 4, there is shown a preferred organization of the VAER 39. The SPU 13 can read the contents of the VAER 39 to determine pending vector arithmetic exceptions. The SPU 13 need not, and preferably cannot, write to the VAER 39. As shown, the VAER 39 includes two fields in the preferred embodiment: a vector destination register mask 210 and an exception condition summary 220. The vector destination register mask field 210 of the VAER 39 records which vector registers have received a default value due to arithmetic exceptions. If the nth one of the sixteen vector registers receives a default value as a result of an arithmetic exception, the exception units 36, 37 write a one to bit n of mask field 210 (bit (16+n) of the VAER 39).

The exception condition summary field 220 indicates the type of exception which has occurred. Preferably those conditions include floating underflow, floating divide by zero, floating reserved operand, floating overflow or integer overflow exception conditions.

As is apparent from the above hardware description, the vector processor unit 12 can be programmed for either synchronous or asynchronous handling of memory management exceptions. The exceptions that may occur during the execution of vector instructions include vector memory management exceptions and vector arithmetic exceptions. During synchronous memory management, exceptions are handled immediately and execution of the faulting vector memory access instruction is then restarted. The instruction is restarted by backing the instruction up to the beginning. At that point, a memory management fault is initiated, and the value in a program counter identifies the faulting instruction.

The handling of an asynchronous memory management exception is complicated by the need to store state information of the VPU 12. Not only is the SPU 13 allowed to execute scalar instructions simultaneously with the vector coprocessor, but the vector processor can be executing vector arithmetic instructions along with a vector memory access instruction. When a memory management instruction occurs, the VPU 12 takes steps to freeze its state so that its state can be stored and later recalled in order to resume processing at the point where the exception occurred. Any other vector instructions being executed along with the faulting instruction continue so long as they are not dependent upon data from the faulting vector instruction. The exception is reported to the operating system, which processes the memory management exception. Then the VPU 12 restores its state and resumes instruction execution.

For handling arithmetic exceptions, the faulting vector instruction is executed to completion. When an arithmetic exception occurs, either a default value or a truncated result is written into a corresponding vector element register. The arithmetic exception condition type and destination register number are recorded in the vector arithmetic exception register VAER 39. If an "exception enable" bit in the vector coprocessor is set, the VPU 12 disables itself. The VPU 12 will complete the execution of the vector instruction causing the exception as well as any other instructions already in the VPU 12, but will then refuse to accept subsequent vector instructions from the main processor until re-enabled. If the main processor later attempts to send a vector instruction to the VPU 12 when it is disabled, a "Vector Processor Disabled Fault" exception is reported to the operating system. The operating system reads the exception summary register and reports the exception to the user program.

Although coprocessor exceptions are handled on either an asynchronous or synchronous basis, it is sometimes desirable to synchronize the VPU 12 for a brief period of time during a "scalar context switch." In a scalar context switch, for example, execution of one process, called the "last process", is halted and execution of a new process, called the "current process", is begun. Such a context switch is handled by first synchronizing the VPU 12. For this purpose there is provided a "SYNC" instruction that causes the SPU 13 to suspend the execution of further instructions until the VPU 12 has completed all of its operations.

After the VPU 12 has been synchronized, the operating system saves only the scalar state information of the last process. During this step the contents of all the registers in the SPU 13 are saved. But the state information of the VPU 12 is not saved at this time. Next, the operating system disables the VPU 12. Then the state information for the current process is loaded from memory into the SPU 13, and finally the current process begins execution. If the current process executes a vector instruction, then a "Vector Processor Disabled Fault" occurs. This fault is handled by processing any vector exception conditions, storing the VPU 12 state information from the process which last executed a vector instruction, retrieving the VPU 12 state information for the current process, and re-enabling use of the VPU 12.

Figure 5A:
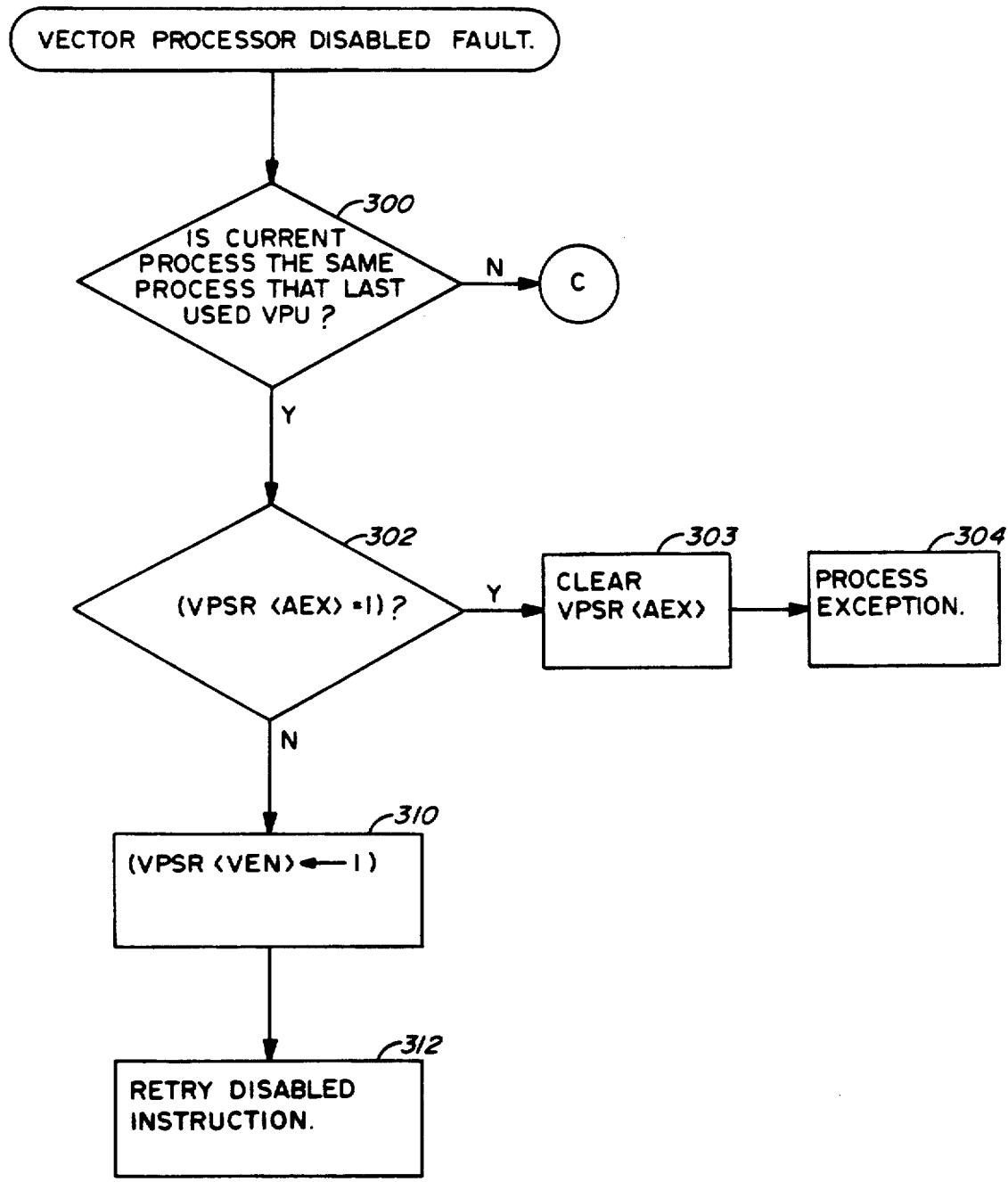
FIGS. 5a, 5b and 5c together comprise a flowchart of a Vector Processor Disabled Fault Routine for the data processing system of FIG. 1.
Figure 5B:
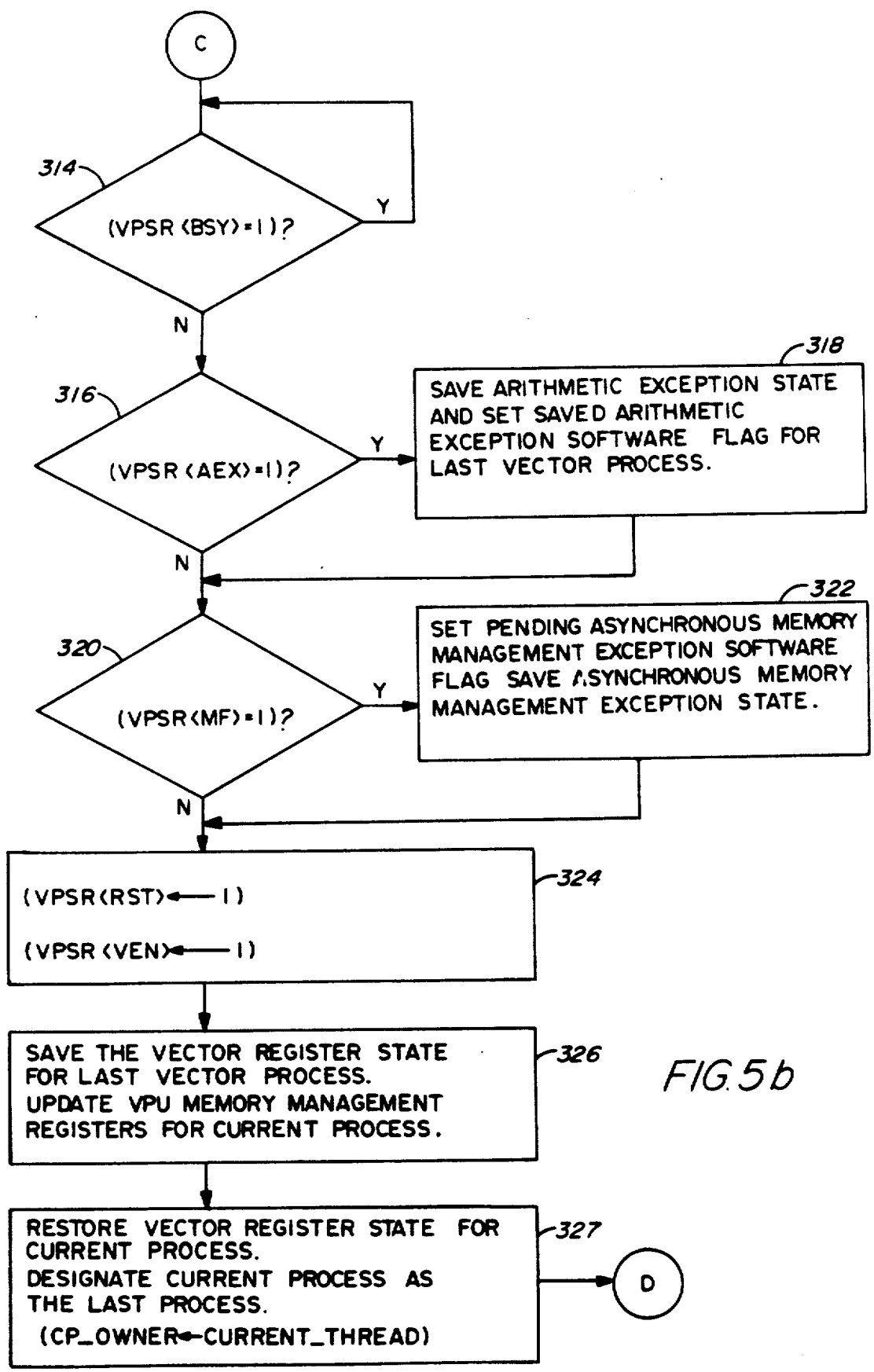
Figure 5C:
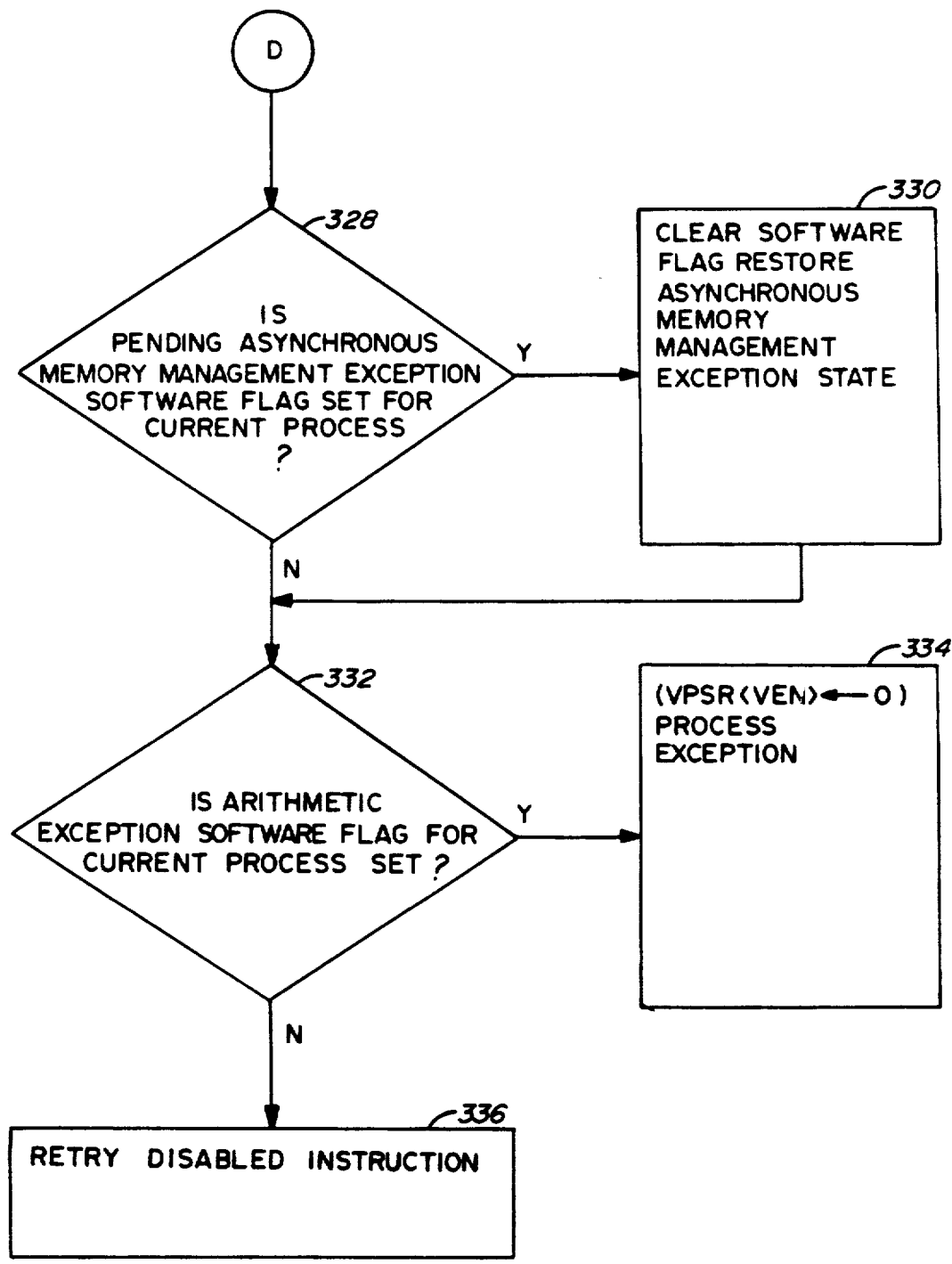

FIGS. 5a to 5c show a flowchart of a preferred procedure to process a Vector Processor Disabled Fault. The purpose of this algorithm is threefold: (1) to process any vector exception conditions; (2) to store all VPU 12 state information from the process which last executed a vector instruction; and (3) to retrieve the VPU 12 state information for the current process. Items (2) and (3) are not necessary if the current process is the same as the process which last used VPU 12. Item (1) is necessary only when an exception condition is pending. It is possible, however, that items (1), (2), and (3) must all be completed before the currently executing process executes a vector instruction.

The first step in the Vector Processor Disabled Fault operation is to determine whether the current process is also the last process to have used VPU 12 to execute a vector instruction (step 300) in FIG. 5a. If the determination in step 300 is "YES," it is unnecessary to update the state information for VPU, it is determined whether there are any pending vector arithmetic exception conditions (step 302). The data processing system 10 does not process the vector arithmetic exceptions when they occur, but instead processes them when VPU 12 is used next. This may be the same time that VPU 12 saves its vector state information and retrieves the vector state information for the current process. The presence of vector arithmetic exception conditions is determined by SPU 13's examination of AEX bit 170 (arithmetic exceptions) of VPSR 44.

If there is a pending arithmetic exception, then AEX bit 170 is cleared (step 303) and the exception is processed (step 304) in a manner appropriate to the exception in accordance with a procedure known to persons of ordinary skill in the data processing field. If there is no pending arithmetic exception condition (step 302), it may be necessary to determine whether a context switch has occurred since the last Vector Processor Disabled Fault. Even when the current process is the same as the process which last used VPU 12 (step 300) and, therefore there is no need to save or restore VPU 30 vector state information, it may be necessary to update registers in VPU 12 which are affected by normal scalar processing. If, for example, VPU 12 contains copies of memory management registers located in SPU 13, the registers in VPU 12 would have to be updated after every context switch to ensure that their contents match the contents of the SPU 13 registers.

Next, VPU 12 is enabled by setting VEN bit 110 (step 310). Then control returns back to the vector instruction that caused the fault, and the instruction is re-issued (step 312). Now that VPU has been enabled (in step 310 of FIG. 5a), the vector instruction will be executed on VPU 12, and execution of instruction sequence continues.

If the current process is not the same as the process which last used VPU 12 (step 300), then several steps occur, as shown in FIG. 5b. The SPU 13 first waits until VPU 12 is not executing a vector instruction (step 314). This not busy state is indicated by a zero value in BSY bit 190 of VPSR 44. Second, it is determined if any pending arithmetic exceptions exist (step 316). If AEX 170 of VPSR 44 is set, indicating the presence of a pending arithmetic exception, the arithmetic exception state, as contained in VAER 39, is saved and the existence of an arithmetic exception for the last process to use VPU 12 is noted for later processing (step 318). Notation of such an exception preferably is accomplished via a software flag associated with the last process to use VPU 12.

The next step is to determine if a pending asynchronous memory management exception exists (step 320). Preferably, if such an exception exists, as indicated by a value of one in bit MF 150 of VPSR 44, a software flag associated with the last process to use VPU 12 is set and vector information is saved for that process (step 322).

Next, VPU 12 is reset by setting RST 120 of VPSR 44 and VPU 12 is enabled by setting VEN bit 110 of VPSR 44 (step 324). Since the current process is not the same as the process which last used VPU 12 (step 300), then the state information of VPU 12 must be updated. This is done in two steps. First, the state information in VPU 12 is stored into an area of memory processing unit 14 corresponding to the process which last used VPU 12 (step 326). There may also be provided memory management registers in SPU 13 and corresponding memory management registers in VPU 12 to effect virtual addressing and memory protection functions. In this case, the memory management registers in VPU 12 may need to be updated to ensure that they match the corresponding memory management registers in SPU 13. Next the state information for VPU 12 for the current process is retrieved from an area of memory processing unit 14 corresponding to the current process and is stored into the vector registers of VPU 12 (step 327). Moreover, at this time the current process is designated as the last process to use the vector processor.

Continuing now on FIG. 5c, a software flag associated with the current process is checked to determine if there is a pending asynchronous memory management exception for the current process (step 328). If such a pending exception exists, the software flag for the current process is cleared and the vector state at the time of the asynchronous memory management exception is restored (step 330). This is accomplished by writing the address of the saved vector state information to VSAR 41 and by setting RLD bit 140 and VEN bit 110 of VPSR 44.

Next a software flag associated with the current process is checked to determine if there is a pending arithmetic exception for the current process (step 332). If such a pending exception exists, bit VEN 110 of VPSR 44 is cleared, disabling VPU 12, and the arithmetic exception is processed, similarly to step 304, in a manner in accordance with a procedure known to persons of ordinary skill in the data processing field (step 334).

When the Vector Processor Disabled Fault handling algorithm of FIG. 5c is complete (step 336) it returns control back to the vector instruction that caused the fault, and the instruction is re-issued. Now that the VPU 12 has been enabled (in step 324 of FIG. 5b), the vector instruction will be executed on VPU 12, and execution of the instruction sequence continues.

Further details of the data processing system (10 in FIG. 1) are described in the above-identified cross-referenced applications. These details, however, are not necessary for the understanding or use of the present invention, which has general applicability to any data processing system of the kind having a main processor and a coprocessor which runs asynchronously with respect to the main processor and therefore causes reporting of coprocessor exceptions to the user program to be delayed by an imprecise amount of time. The present invention more particularly concerns programming for such a data processing system in order to confine the reporting of the delayed exceptions to the code thread that generates the exception.

In accordance with a basic aspect of the present invention, there is provided a mechanism for saving and restoring the exception state of the coprocessor that confines the reporting of delayed coprocessor exceptions to the code thread that generates the exceptions. As will be more fully described below, the mechanism is particularly useful in connection with code threads in the same process, and in this case, there is no need to save and restore all of the coprocessor state information.

Preferably the mechanism for saving and restoring the exception state is implemented by a pair of software functions, or primitives, in the operating system. These primitives include a "Save-Exception-State" primitive that saves in memory any coprocessor exception state pertinent to the currently executing code thread, and a "Restore-Exception-State" primitive that restores a selected one of the exception states having been saved. The Save-Exception-State primitive, for example, returns an identification of a save area in memory in which the saved exception state information is stored. The save area also contains an identification of what was the currently executing code thread when the exception state was saved in the save area or the save area is otherwise linked to the thread descriptor of that currently executing thread. In this case the Restore-Exception-State primitive is invoked with a certain parameter or argument set to identify the save area of the exception state to be restored.

Figure 6:
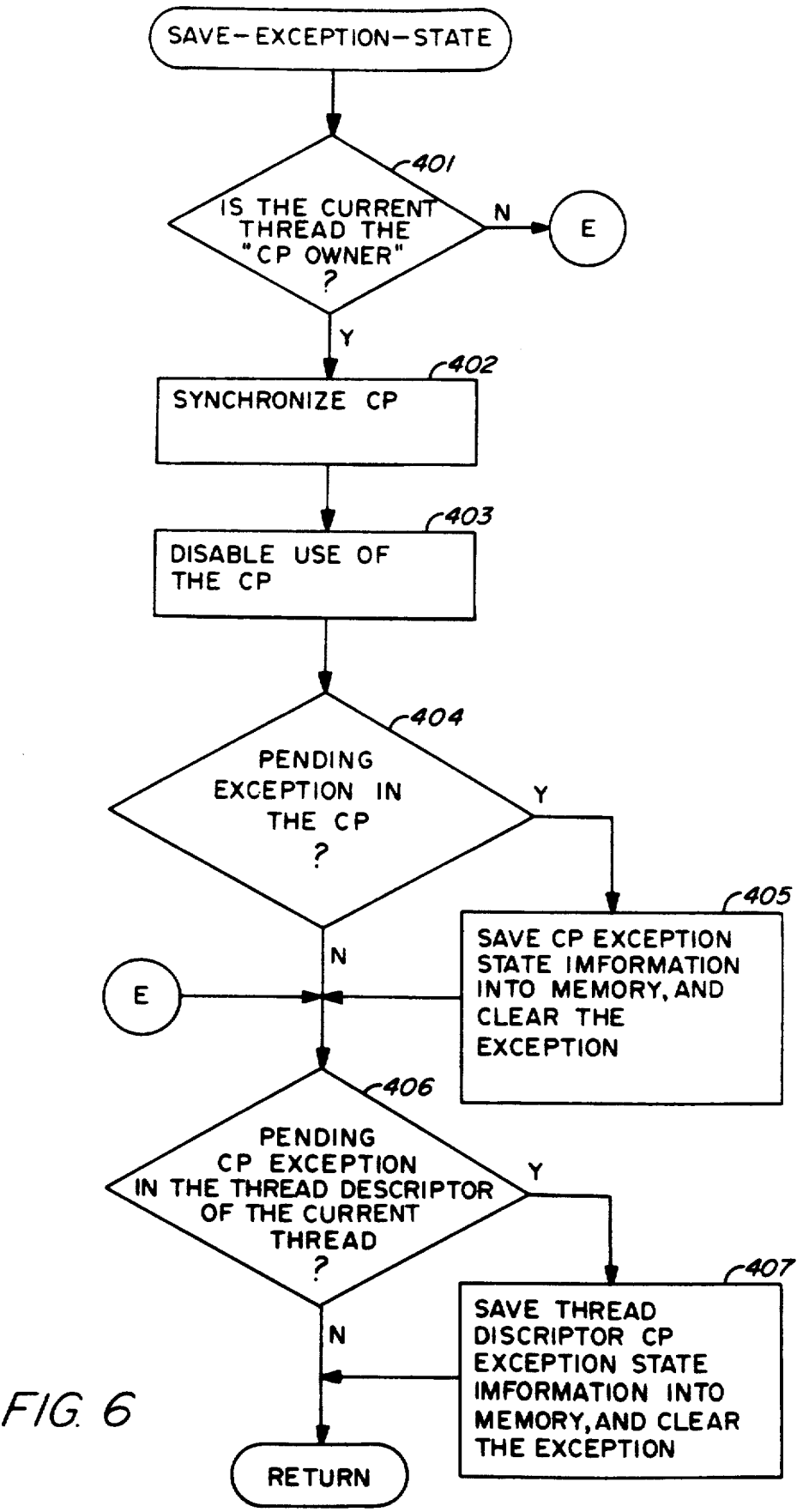
FIG. 6 is a flowchart of a Save-Exception-State primitive in accordance with the present invention.

Turning now to FIG. 6, there is shown a flowchart of the basic procedure for the "Save-Exception-State" primitive which saves any exception state information pertinent to the current code thread. In the first step 401 the operating system determines whether the exception state information in the coprocessor is pertinent to the current code thread. The exception state information in the processor is pertinent when the current thread has been executing vector instructions, or more precisely when the "current thread" is "the owner" of the coprocessor.

The operating system maintains respective areas of memory called "thread descriptors" that are allocated to respective code threads recognized as such by the operating system. The operating system also ensures that a predefined memory location (CURRENT_THREAD) has a value identifying a particular one of these code threads which is currently being executed under the control of the operating system. As will be further described below in conjunction with FIG. 10, a user program called a "multi-tasking manager" may use a similar technique to recognize and manage the execution of smaller code threads that together are included in one code thread recognized by the operating system.

The coprocessor is initially disabled. When the main processor first issues a coprocessor instruction of a new code thread to the disabled coprocessor, the "CP-disabled" fault occurs. In handling that fault, and as further described below in conjunction with FIG. 8 (in step 608), another predefined memory location (CP_OWNER) receives at that time an indication of the current thread which is deemed the owner of the coprocessor until the coprocessor is later disabled and a coprocessor instruction is issued to the coprocessor from another code thread. The operating system ensures that the coprocessor is disabled when processing by the "CP owner" is finished or suspended before a new code thread is dispatched for execution. The coprocessor is also disabled when a coprocessor exception occurs.

Returning now to step 401, it should be apparent that the operating system determines whether the current thread owns the coprocessor by comparing the contents of the two predefined memory locations (CURRENT_THREAD and CP_OWNER), and if the contents are same, execution continues to steps 402-405 to save any pertinent coprocessor exception state information in the coprocessor. Otherwise, these steps are skipped because then any exception state information in the coprocessor is not pertinent to the current thread. Either the coprocessor has not been used or it is owned by a different code thread.

In step 402 the coprocessor is synchronized so that the main processor will process no further instructions until the coprocessor has completed all of its operations. For the computer system 10 of FIG. 1, for example, when the scalar processing unit 13 decodes a "SYNC" instruction, the vector processing unit 12 will become synchronized. As a result of this step, the coprocessor state information will indicate any exceptions resulting from the code thread execution preceding the "Save-Exception-State" primitive.

Next in step 403 of FIG. 6, the CP is disabled. This permits the exception state information in the CP to be stored into memory for reporting at a later time when a coprocessor instruction is issued, causing a CP-Disabled Exception that is handled as described below in connection with FIG. 8. In step 404 the CP is checked for a pending exception. For the vector processing unit 12 of FIG. 2, this is done by checking whether the "AEX" bit of the VPSR is set.

If a pending exception is found, then in step 405 the CP exception state information is saved into a save area of memory, and the exception is cleared from the CP. For the vector processing unit 12 of FIG. 2, the exception state information is read from the VAER 39 and stored in the memory processing unit 14 of FIG. 1. The exception state of the coprocessor is cleared so that no pending exceptions will be indicated for the code thread execution following the Save-Exception-State primitive. For the vector processing unit 12 of FIG. 2, this involves writing a one to (RST) bit 120 of the VPSR 44, which clears the VAER 39.

Since coprocessor exception state information is saved into operating system maintained thread descriptors, as further described below in conjunction with FIG. 7, it is possible that exception state information pertinent to the current thread may have been saved into the thread descriptor of the current thread. This possibility is checked in step 406, and if a pending exception is indicated, then in step 407 the exception state information is transferred from the thread descriptor to the save area of memory, and the exception is cleared from the thread descriptor.

A listing of VAX program code for a specific embodiment of the Save-Exception-State primitive for use in the data processing system 10 of FIG. 1 is included in Appendix A.

Figure 7:
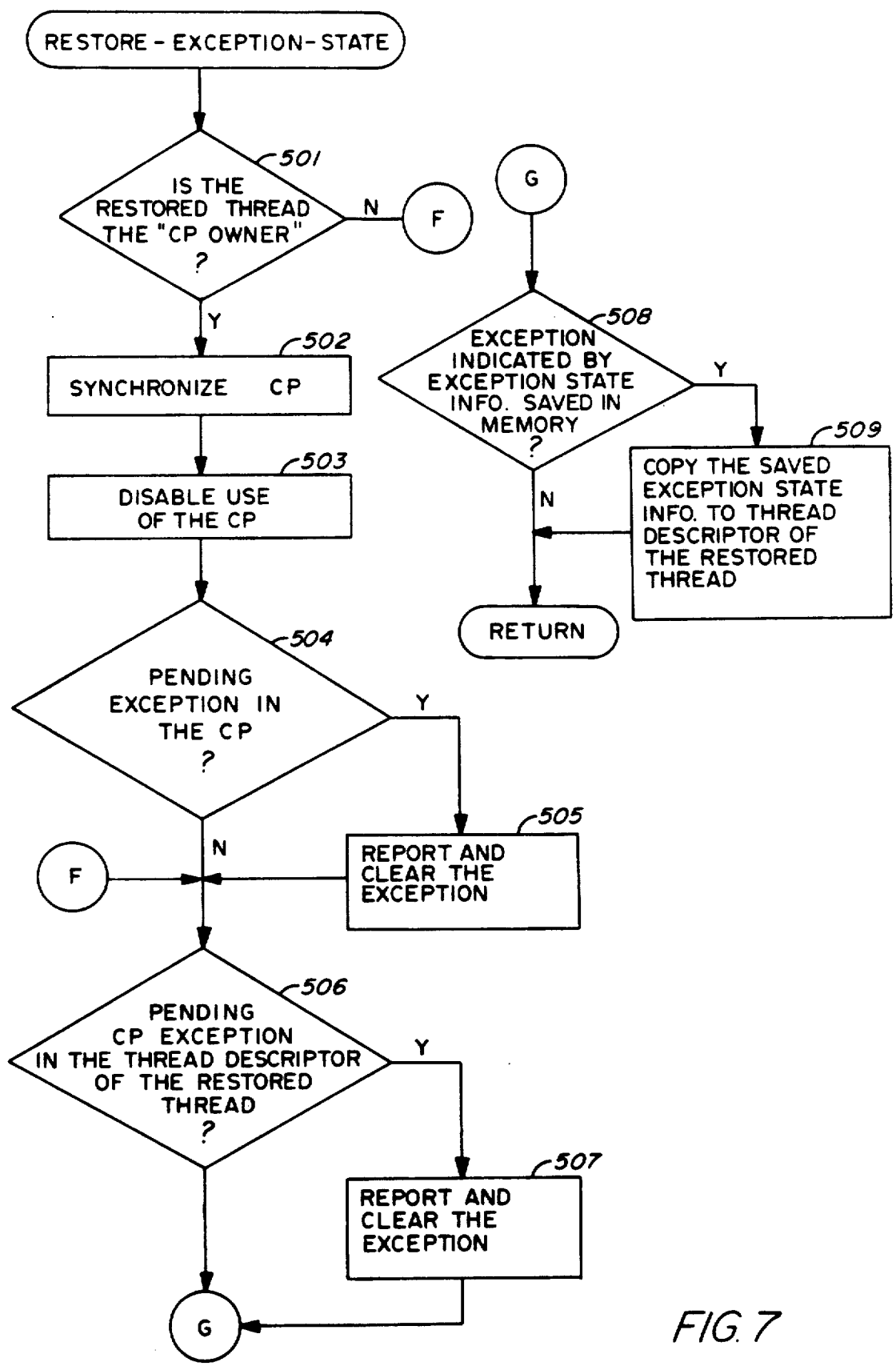
FIG. 7 is a flowchart of a Restore-Exception-State primitive in accordance with the present invention.

Turning now to FIG. 7, there is shown a flowchart of the basic procedure for the Restore-Exception-State primitive. In the first step 501 the main processor determines whether the code thread for which pertinent exception state is being restored is the owner of the coprocessor. In most cases this "restored thread" is the same as the "current thread" because in most programs a save area identifier is not passed from one operating-system defined code thread to another. If the restored thread is the same as the owner of the coprocessor, then any pending exception in the coprocessor should be reported and cleared before its exception state is restored with the saved exception state information, in order to prevent exceptions from becoming lost. Otherwise, if the restored thread is not the owner of the coprocessor, execution branches around steps 502-505.

If the restored thread is the owner of the coprocessor, then in step 502 the coprocessor is synchronized so that the exception state information in the coprocessor indicates any exceptions generated by the code thread execution preceding the Restore-Exception-State primitive. Then in step 503 the coprocessor is disabled so that saved exceptions are reported at a later time when a coprocessor instruction is executed, causing a CP-Disabled Exception that is handled as described below in connection with FIG. 8. Any exceptions pending in the coprocessor, as detected in step 504, are reported and cleared from the coprocessor in step 505. The presence of pending exceptions in the vector processing unit 12 of FIG. 1, for example, is indicated by the exception condition summary 220 of the VAER 39, as shown in FIG. 4.

It is possible that the thread descriptor of the restored thread will indicate an exception before the saved exception state is restored into it. To prevent a preexisting exception state in the thread descriptor from being overwritten and lost, any preexisting exception state is detected in step 506, and any exception indicated by the exception state is reported and cleared in step 507.

Next in step 508 the exception state information having been saved in memory in step 407 of FIG. 6 is inspected to detect the presence of any indicated exceptions. If any exception is so indicated, then in step 509 the saved exception state information is transferred to a respective thread descriptor memory location allocated to the restored code thread, because the restored thread includes the instructions that were executed when the exception was generated.

A listing of VAX program code for a specific embodiment of the Restore-Exception-State primitive for use in the data processing system 10 of FIG. 1 is included in Appendix A.

Figure 8:
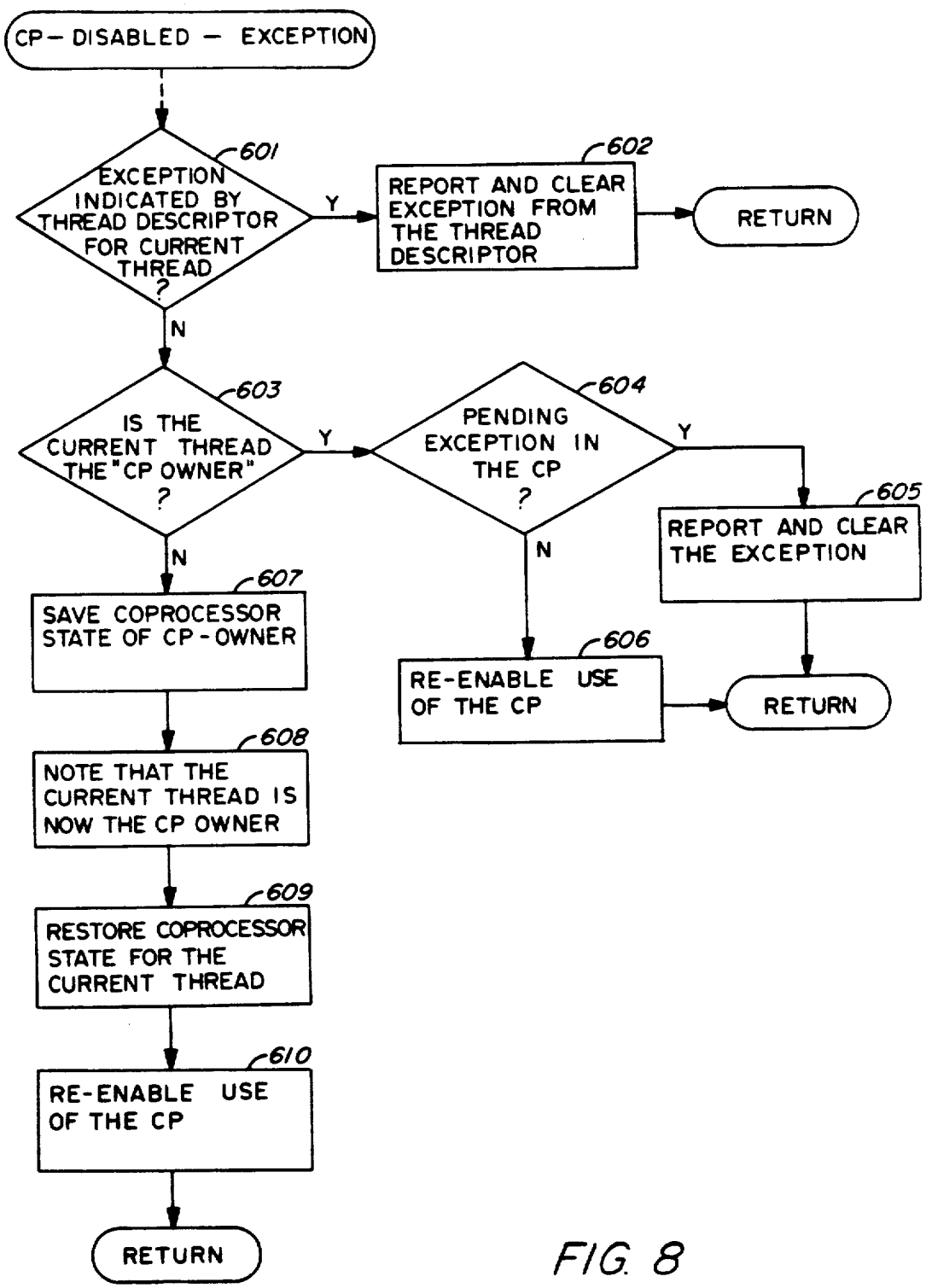
FIG. 8 is a flowchart of a CP-disabled exception routine that is used to report coprocessor exceptions.

Turning now to FIG. 8, there is shown a flowchart of the portion of the CP-Disabled Exception handler which reports pending or restored exceptions. In step 601 the thread descriptor for the current thread is checked for any pending exceptions that may have been recorded in step 509 of FIG. 7. If an exception is found, in step 602 it is reported and cleared from the thread descriptor, and execution returns. Otherwise, in step 603 the "current thread" is compared to the "CP-owner" to determine whether the current thread owns the processor. If so, then in step 604 the coprocessor is checked for any pending exceptions. If an exception is found, in step 605 the exception is reported and cleared from the coprocessor, and execution returns. If no pending exception is found in the coprocessor, then in step 606 the coprocessor is enabled for use, and execution returns. In contrast, after an exception is reported and cleared in either step 602 or step 605, the coprocessor remains disabled. This is done so that the coprocessor will not be enabled until the CP-disabled exception handling routine is again invoked to ensure that all pending exceptions are reported and cleared.

If step 603 finds that the current thread does not own the coprocessor, then a coprocessor state context switch is performed. In step 607 the state of the coprocessor from executing the CP-owner thread is saved. Then in step 608 the ownership of the coprocessor is assigned to the current thread. In other words, the value of the predetermined memory location "CP_OWNER" is set equal to the value of the memory location "CURRENT_THREAD". After noting the next CP owner in step 608, the coprocessor state for the current thread is restored in step 609. Finally, in step 610 the coprocessor is enabled. Execution then returns to continue execution of the current code thread, which is now the current owner of the coprocessor.

Figure 9:
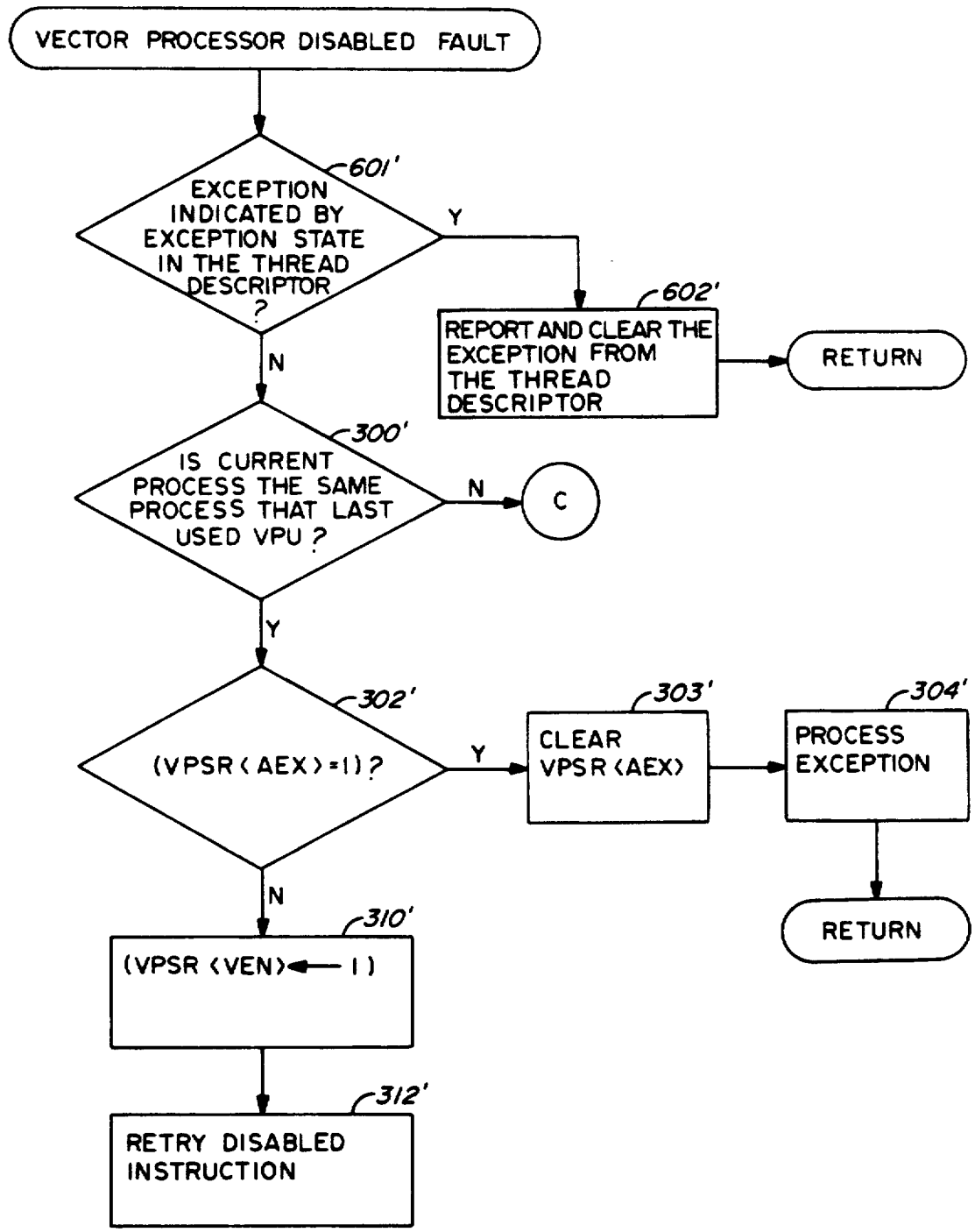
FIG. 9 is a flowchart of a Vector Processor Disabled Fault routine similar to the routine of FIG. 5a but incorporating the exception reporting mechanism of FIG. 8.

Turning now to FIG. 9, there is shown a flowchart similar to FIG. 5a which shows that steps 601 and 602 of FIG. 8 can be inserted into the flowchart of FIG. 5a to provide a Vector Processor Disabled Fault handler that will report the saved and restored exceptions for the data processing system, 10 of FIG. 1. As shown in FIG. 9, steps 601' and 602' corresponding to steps 601 and 602 of FIG. 8 are inserted at the beginning of the fault handler routine to report any faults indicated by the exception state in the thread descriptor. Faults indicated by the VAER 39 of the VPU 12 (FIG. 2) are reported in the fashion as described above in connection with FIGS. 5a-5c. Also, steps 326 and 327 in FIG. 5b correspond to steps 607, 608 and 609 in FIG. 8.

Figures 10, 11:
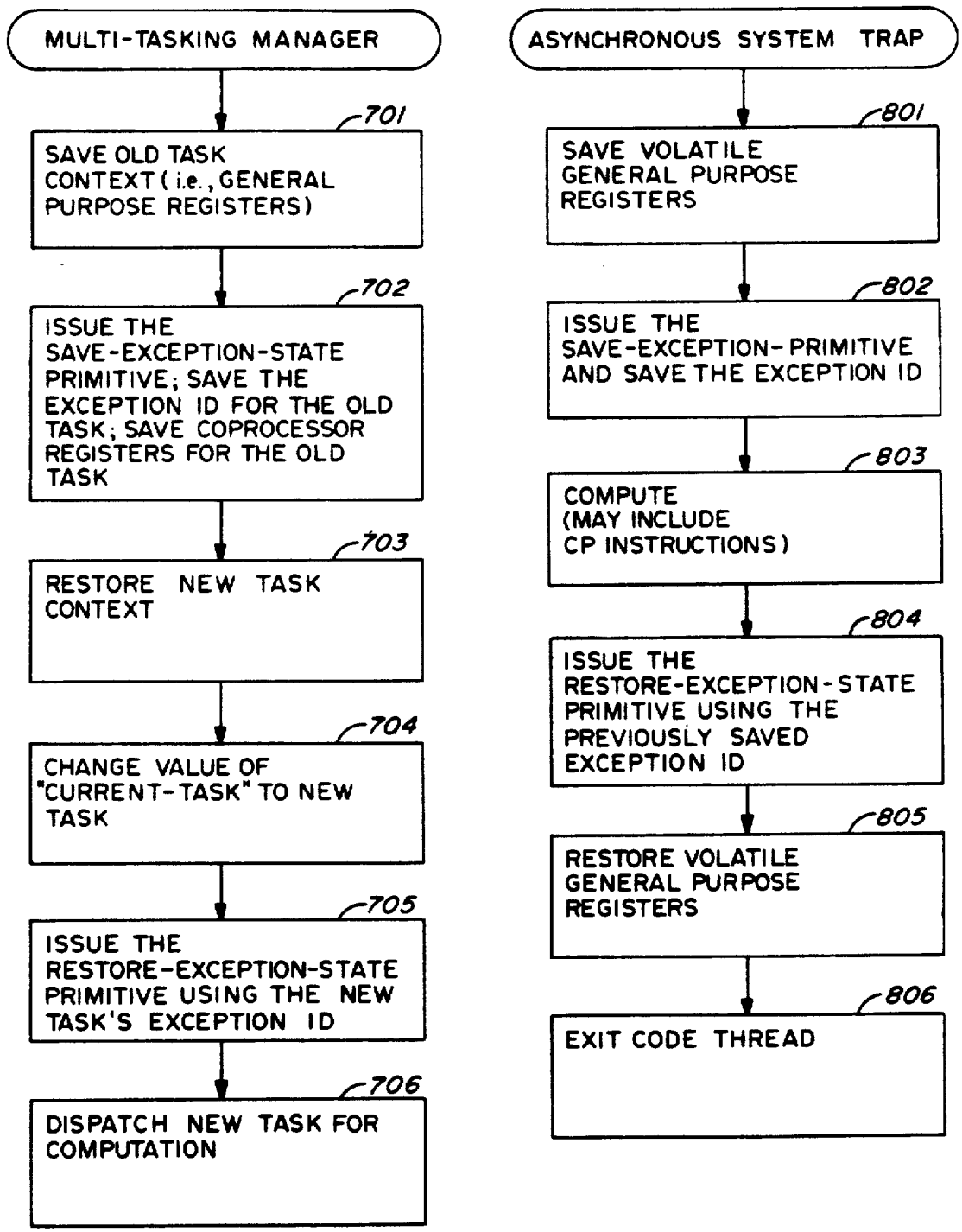
FIG. 10 is a flowchart of a multi-tasking manager routine that uses the Save-Exception-State and Restore-Exception-State primitives of FIGS. 6 and 7 to confine the reporting of an exception to within the code thread including the code that generates the exception.
FIG. 11 is a flowchart of an Asynchronous System Trap routine.

Turning now to FIG. 10, there is shown a flowchart of a multi-tasking manager routine which uses the Save-Exception-State and Restore-Exception-State primitives to confine the reporting of a coprocessor exception to the task that generates the exception. This multi-tasking manager could be used, for example, to manage the scheduling of a number of programs that are in the same process, and which share the coprocessor registers, for example, the vector register file 22 in the case of the vector processor unit 12 of FIG. 2. The multitasking manager, for example, is executed in response to a periodic interrupt signal in order to pass execution from one task (the "old task") to the next task (the "new task") in a sequence of tasks. In other words, the multi-tasking manager recognizes certain code threads in a user process as distinct tasks, and shares execution time among these tasks.

In step 701 of FIG. 10, the old task context, i.e., the contents of general purpose registers in the main processing unit, are saved in memory allocated to the managing of the old task. Then in step 702 the Save-Exception-Primitive is issued to save the indication of any exceptions generated by code in the old task preceding the execution of the multitask manager. The exception ID returned by the primitive is saved in the memory allocated to managing task. The coprocessor registers are also saved in the memory allocated to managing the old task. In step 703 the context of the new task is restored, i.e., by loading the general purpose registers in the main processing unit and the coprocessor registers with values saved in memory allocated to the managing of the new task. Next in step 704 a "current task" identifier (CURRENT_TASK) is set to indicate that the new task is being executed. In step 705 the Restore-Exception-State primitive is issued using an exception ID previously saved for the new task to restore the exception state information for the new task. Finally, in step 706 the new task is dispatched for computation.

Turning now to FIG. 11 there is shown another example of using the Save-Exception-State and Restore-Exception-State primitives. In this case they prevent exceptions generated in a user program from being reported in an asynchronous trap routine. The asynchronous trap routine, for example, transfers input/output data from an I/O device (not shown), and may use registers in the coprocessor, such as the registers in the vector register file 22 of FIG. 2.

In the first step 801, the volatile general purpose registers are stored in memory. A volatile general purpose register, for example, is a register that is used both by the user program and the asynchronous trap routine of FIG 11. The volatile general purpose registers are, for example, pushed on a stack in memory. Next in step 802 the Save-Exception-State primitive is issued to save the exception state of the user program. The exception ID returned by the primitive is saved, for example by pushing it on the stack.

In step 803, computations are performed to effect the task of the asynchronous system trap, for example, to transfer input/output data between an input/output device and registers in the coprocessor, and to set a flag indicating that the transfer has been accomplished. In other cases the computations might not involve the execution of coprocessor instructions.

In step 804, the Restore-Exception-State primitive is issued using the previously saved exception ID to restore the exception state of the user program. The saved exception ID is obtained, for example, by popping it off the stack. Then, in step 805, the volatile general purpose registers are restored, for example, by popping the register values off the stack. Finally, in step 806, execution exits the asynchronous system trap task and returns to the user program.

The Save-Exception-State and Restore-Exception-State primitives can also be used as small portions of routines to save and restore the entire state of the coprocessor. This is illustrated by the VAX program listing in Appendix C of a program which saves and restores the entire state of the vector processing unit 12 of FIG. 2. This program also illustrates that considerable execution time is saved by using the Save-Exception-State and Restore-Exception-State primitives to confine the reporting of exceptions to code threads in the same process, instead of saving and restoring the entire state of the vector processor 12 when switching execution among the code threads.

In view of the above, there has been described a method and apparatus for handling delayed exceptions generated by an asynchronous coprocessor that confines the reporting of the delayed exceptions to the respective code threads that generate the exceptions. Exceptions incurred outside a code thread will not be reported within the code thread. All exceptions incurred within a code thread will be reported. Moreover, a code thread can execute transparently with respect to all other threads, since it does not alter any thread state, including the exception state. Transparent execution is very desirable, for example, in the case of an asynchronous debugger thread.

APPENDIX A

SAVE EXCEPTION STATE PRIMITIVE
Copyright C 1989 Digital Equipment Corporation

VP_SERVICES - Vector Processing System Services 4-OCT-1989 21:32:22 VAX MACRO T5.2V-4 Page A-1
X-8 $SAVE_VP_EXCEPTION - Save Vector Excepti 28-SEP-1989 13:13:17 [SYS.SRC]VP_SERVICES.MAR;1

```
014E    805    .SBTTL $SAVE_VP_EXCEPTION - Save Vector Exception State
014E    806
014E    807    ;++
014E    808    ;
014E    809    ; EXE$SAVE_VP_EXCEPTION - Save Vector Exception State
014E    810    ;
014E    811    ; FUNCTIONAL DESCRIPTION:
014E    812    ;
014E    813    ; This service provides the capability to save the exception state
014E    814    ; of the vector processor. It performs some validation in the mode
014E    815    ; of the caller, then issues the real Save Vector Exception State
014E    816    ; systems service to do the actual work.
014E    817    ;
014E    818    ; INPUTS:
014E    819    ;
014E    820    ; EXCID(AP) = address of a longword to return the exception id.
014E    821    ;
014E    822    ; SAVE_ESC_FLAGS(AP) = $SAVE_VP_EXCEPTION flags
014E    823    ; bit 0: do not allocate exception block
014E    824    ;
014E    825    ; OUTPUTS:
014E    826    ;
014E    827    ; R0 = SS$_NORMAL - Normal successful completion -- the vector processor
014E    828    ; had no error pending.
014E    829    ;
014E    830    ; R0 = SS$_WASSET - Normal successful completion -- the vector processsor
014E    831    ; had an error pending.
014E    832    ;
014E    833    ; R0 = SS$_ACCVIO - The exception id longword cannot be written.
014E    834    ;
014E    835    ;
014E    836
014E    837    DECLARE_PSECT EXEC$PAGED_CODE
0196    838
0196    839    SYSTEM SERVICE SAVE_VP_EXCEPTION,-
0196    840    <R2,R3,R4,R5>,-
0196    841    MODE=CALLERS_MODE,-
0196    842    NARG=2
0198    843
0198    844    ;
0198    845    ; This is an all-mode service, so arguments are not PROBEd and access
0198    846    ; violations can happen.
0198    847    ;
```

APPENDIX A-continued

SAVE EXCEPTION STATE PRIMITIVE
Copyright © 1989 Digital Equipment Corporation

|  |  |  |  |
|---|---|---|---|
|  | 0198 | 848 |  |
| 6 D 00000000'GF 9E | 0198 | 849 | MOVAB G EXE$SIGTORET,(FP) ; Establish handler |
| 53 04 AC D0 | 019F | 850 | MOVL EXCID(AP),R3 ; Get the address of exception id |
| 63 D4 | 01A3 | 851 | CLRL (R3) ; Initialize exception id |
| 50 01 D0 | 01A5 | 852 | MOVL #SS$_NORMAL,R0 ; Assume success status |
| 3A 00000000'GF E9 | 01A8 | 853 | BLBC G CTL$GL_VP_FLAGS,20$ ; Branch if not a vector_VVIEF |
|  | 01AF | 854 | ; consumer |
| 55 00000000'GF D0 | 01AF | 855 | MOVL G CTL%GL_PHD,R5 ; Get PHD address |
| 08 E1 | 01B6 | 856 | BBC #PHD$V_VP_CONSUMER,- ; Branch if not a |
| 0C 00AA C5 | 01B8 | 857 | PHD$W_FLAGS(R5),10$ ; vector consumer |
|  | 01BC | 858 |  |
|  | 01BC | 859 | $SAVE_VP_EXC_INT_S EXCID = EXCID(AP),- ; Call the real service |
|  | 01BC | 860 | SAVE_EXC_FLAGS(AP) |
|  | 01C8 | 861 |  |

VP_SERVICES - Vector Processing System Services 4-OCT-1989 21:32:22 VAX MACRO T5.2V-4 Page A-2
X-8 $SAVE_VP_EXCEPTION - Save Vector Excepti 28-SEP-1989 13:13:17 [SYS.SRC]VP_SERVICES.MAR;1

|  |  |  |  |
|---|---|---|---|
| 51 DC | 01C8 | 862 | 10$: MOVPSL R1 ; Is current mode = user ? |
| 03 51 02 18 ED | 01CA | 863 | CMPZV #PSL$V_CURMOD,R1,#PSL$C_USER |
| 18 12 | 01CF | 864 | BNEQ 20$ ; IF NEQ no, don't call VVIEF |
| 52 00000000'GF D0 | 01D1 | 865 | MOVL G CTL$GL_VVIEF ADDR,R2 ; Get the address of VVIEF |
| 0F 13 | 01D8 | 866 | BEQL 20$ ; If EQL, not there |
| 50 04 D0 | 01DA | 867 | MOVL #VVIEF$K_SAVE_VP_EXCEPTION,R0 ; Get the VVIEF action code |
| 51 53 D0 | 01DD | 868 | MOVL R3,R1 ; Copy address of exception id |
| 62 16 | 01E0 | 869 | JSB (R2) ; Notify VVIEF |
| 63 D5 | 01E2 | 870 | TSTL (R3) ; Do not return a result from |
|  | 01E4 | 871 | ; the emulator if the internal |
|  | 01E4 | 872 | ; service returned a result |
| 03 12 | 01E4 | 873 | BNEQ 20$ ; If NEQ yes |
| 63 51 D0 | 01E6 | 874 | MOVL R1,(R3) ; Else return exception ID from VVIE |
|  | 01E9 | 875 |  |
| 04 | 01E9 | 876 | 20$: RET ; Back to the caller |
|  | 01EA | 877 |  |
|  | 01EA | 878 |  |

VP_SERVICES - Vector Processing System Services 4-OCT-1989 21:32:22 VAX MACRO T5.2V-4 Page A-3
X-8 $SAVE_VP_EXCEPTION - Save Vector Excepti 28-SEP-1989 13:13:17 [SYS.SRC]VP_SERVICES.MAR;1

|  |  |  |  |
|---|---|---|---|
|  | 01EA | 880 | .SBTTL -- $SAVE_VP_EXC_INT - Internal form |
|  | 01EA | 881 |  |
|  | 01EA | 882 | ;++ |
|  | 01EA | 883 | ; |
|  | 01EA | 884 | ; EXE$SAVE_VP_EXC_INT - Save Vector Exception State, internal form |
|  | 01EA | 885 | ; |
|  | 01EA | 886 | ; FUNCTIONAL DESCRIPTION: |
|  | 01EA | 887 | ; |
|  | 01EA | 888 | ; This service provides the capability to save the exception state of |
|  | 01EA | 889 | ; the vector processor. |
|  | 01EA | 890 | ; |
|  | 01EA | 891 | ; INPUTS: |
|  | 01EA | 892 | ; |
|  | 01EA | 893 | ; EXCID(AP) = address of a longword to return the exception id. |
|  | 01EA | 894 | ; |
|  | 01EA | 895 | ; SAVE_EXC_FLAGS(AP) = $SAVE_VP_EXCEPTION flags |
|  | 01EA | 896 | ; bit 0: do not allocate exception block |
|  | 01EA | 897 | ; |
|  | 01EA | 898 | ; R4 = current process PCB address |
|  | 01EA | 899 | ; |
|  | 01EA | 900 | ; OUTPUTS: |
|  | 01EA | 901 | ; |
|  | 01EA | 902 | ; R0 = SS$_NORMAL - Normal successful completion -- the vector processor |
|  | 01EA | 903 | ; had no error pending. |
|  | 01EA | 904 | ; |
|  | 01EA | 905 | ; R0 = SS$_WASSET - Normal successful completion -- the vector processor |
|  | 01EA | 906 | ; had an error pending. |
|  | 01EA | 907 | ; |
|  | 01EA | 908 | ; R0 = SS$_ACCVIO - The exception id longword cannot be written. |
|  | 01EA | 909 | ; |
|  | 01EA | 910 | ;-- |
|  | 01EA | 911 | DECLARE_PSECT EXEC$NONPAGED_CODE |
|  | 014E | 912 |  |
|  | 014E | 913 | SYSTEM_SERVICE SAVE_VP_EXC_INT,- |
|  | 014E | 914 | <R2,R3,R4,R5,R6>,- |
|  | 014E | 915 | MODE=KERNEL,- |
|  | 014E | 916 | NARG=2 |
|  | 0150 | 917 |  |
| 53 04 AC D0 | 0150 | 918 | MOVL EXCID(AP),R3 ; Get address of exception id |
|  | 0154 | 919 | IFNOWRT #4,(R3),7$ ; Make sure it can be written |
| 63 D4 | 015A | 920 | CLRL (R3) ; Initialize exception id |
|  | 015C | 921 |  |
| 55 00000000'GF D0 | 015C | 922 | MOVL G CTL$GL_PHD,R5 ; Get PHD address |
| 08 E1 | 0163 | 923 | BBC #PHD$V_VP_CONSUMER,- ; Branch if not a vector |

APPENDIX A-continued

SAVE EXCEPTION STATE PRIMITIVE
Copyright © 1989 Digital Equipment Corporation

| | | | |
|---|---|---|---|
| 30 00AA C5 | 0165 | 924 | PHDSW_FLAGS(R5),4$ ; consumer |
| | 0169 | 925 | |
| | 0169 | 926 | DSBINT #IPL$_RESCHED,- ; Keep the CPU for this. |
| | 0169 | 927 | ENVIRON=UNIPROCESSOR |
| | 016F | 928 | |
| | 016F | 929 | FIND_CPU_DATA R0 ; Get the CPU database |
| 54 033C C0 D1 | 0179 | 930 | CMPL CPU$L_VP_OWNER(R0),R4 ; Are we the VP owner? |
| 7C 12 | 017E | 931 | BNEQ 100$ |
| | 0180 | 932 | |
| | 0180 | 933 | ; |
| | 0180 | 934 | ; Disable the vector processor and save the exception state. |
| | 0180 | 935 | ; |
| | 0180 | 936 | |

VP_SERVICES - Vector Processing System Services 4-OCT-1989 21:32:22 VAX MACRO T5.2V-4 Page A-4
X-8 $SAVE_VP_EXCEPTION - Save Vector Excepti 28-SEP-1989 13:13:17 [SYS.SRC]VP_SERVICES.MAR;1

| | | | |
|---|---|---|---|
| 00000000'GF 16 | 0180 | 937 | JSB G EXE$VP_DISABLE ; Disable Vector Processor |
| 56 00000090 8F DB | 0186 | 938 | MFPR #PR$_VPSR,R6 ; Get the VPSR |
| 56 020000E0 8F D3 | 018D | 939 | BITL # < VPSR$M_MF ! - ; Test the various fault bits |
| | 0194 | 940 | VPSR$M_PMF ! - ; If they're all clear, then |
| | 0194 | 941 | VPSR$M_AEX ! - ; return a zero as an |
| | 0194 | 942 | VPSR$M_IVO >,r6 ; exception ID |
| 0B 12 | 0194 | 943 | BNEQ 10$ |
| | 0196 | 944 | |
| | 0196 | 945 | 3$: ENBINT |
| 50 01 3C | 0199 | 946 | 4$: MOVZWL #SS$_NORMAL,R0 ; Set success status |
| 04 | 019C | 947 | RET |
| | 019D | 948 | |
| 50 0C 3C | 019D | 949 | 7$: MOVZWL #SS$_ACCVIO,R0 ; Set failure status |
| 04 | 01A0 | 950 | RET |
| | 01A1 | 951 | |
| | 01A1 | 952 | |
| 11 08 AC E9 | 01A1 | 953 | 10$: BLBC SAVE_EXC_FLAGS(AP),15$ ; Branch if noalloc flag cleared |
| | 01A5 | 954 | ; |
| | 01A5 | 955 | ; Noalloc flag specified. Simply reset the vector processor to clear |
| | 01A5 | 956 | ; the vector exception state. |
| | 01A5 | 957 | ; |
| | 01A5 | 958 | WRITE_VPSR #VPSR$M_RST,SCRATCH=R0 ; Clear exception in processor |
| 00000090 8F 02 DA | 01A5 | | MTPR #VPSR$M_RST,#PR$_VPSR |
| 50 00000090 8F DB | 01AC | | MFPR #PR$_VPSR,R0 |
| FFE0 31 | 01B3 | 959 | BRW 3$ ; Join common exit code |
| | 01B6 | 960 | |
| | 01B6 | 961 | ; |
| | 01B6 | 962 | ; Save exception state, and return exception ID. |
| | 01B6 | 963 | ; |
| 0000025E'EF 16 | 01B6 | 964 | 15$: JSB ALLOC_VEXC ; Get an exception block |
| | 01BC | 965 | |
| 10 A2 56 D0 | 01BC | 966 | MOVL R6,VEXC$L_SAVED_VPSR(R2) ; Save the VPSR |
| 14 A2 00000091 8F DB | 01C0 | 967 | MFPR #PR$_VAER,VEXC$L_SAVED_VAER(R2) ; and the VAER |
| | 01C8 | 968 | |
| 56 02000000 8F D3 | 01C8 | 969 | BITL #VPSR$M_IVO,R6 ; An illegal opcode? |
| 0A 13 | 01CF | 970 | BEQL 20$ |
| | 01D1 | 971 | |
| 00000000'GF 16 | 01D1 | 972 | JSB G EXE$VP_ILLVECOP ; Find out what it was |
| 0E A2 51 B0 | 01D7 | 973 | MOVW R1,VEXC$W_SAVED_IVO(R2) ; Store it |
| | 01DB | 974 | 20$: WRITE_VPSR #VPSR$M_RST,SCRATCH=R0 ; Clear exception in processor |
| 00000090 8F 02 DA | 01DB | | MTPR #VPSR$M RST,#PR$_VPSR |
| 50 00000090 8F DB | 01E2 | | MFPR #PR$_VPSR,R0 |
| | 01E9 | 975 | |
| | 01E9 | 976 | ;*** |
| | 01E9 | 977 | ; |
| | 01E9 | 978 | ; Note: We do *not* do anything for the MF and PMF faults! These are the memory |
| | 01E9 | 979 | ; management faults that can occur on asychronous memory management vector |
| | 01E9 | 980 | ; processors. Since they are only architected and none of them exist, it seems |
| | 01E9 | 981 | ; presumptive to guess what the machines are going to look like. |
| | 01E9 | 982 | ; |
| | 01E9 | 983 | ; |
| | 01E9 | 984 | ;*** |
| | 01E9 | 985 | |
| 54 0150 C4 D0 | 01E9 | 986 | 30$: MOVL PCB$L_VP_CONTEXT(R4),R4 ; Get vector context area |
| 10 A4 62 0E | 01EE | 987 | INSQUE (R2),VCTX$L_VEXCFL(R4) ; Queue up the exception |
| | 01F2 | 988 | |
| | 01F2 | 989 | ENBINT ; Enable interrupts |

VP_SERVICES - Vector Processing System Services 4-OCT-1989 21:32:22 VAX MACRO T5.2V-4 Page A-5
X-8 $SAVE_VP_EXCEPTION - Save Vector Excepti 28-SEP-1989 13:13:17 [SYS.SRC]VP_SERVICES.MAR;1

| | | | |
|---|---|---|---|
| 63 52 D0 | 01F5 | 990 | MOVL R2,(R3) ; Return exception id. |
| 50 09 3C | 01F8 | 991 | MOVZWL #SS$_WASSET,R0 ; Return WASSET |
| 04 | 01FB | 992 | RET |
| | 01FC | 993 | |
| | 01FC | 994 | |

APPENDIX A-continued

SAVE EXCEPTION STATE PRIMITIVE
Copyright © 1989 Digital Equipment Corporation

| | | | |
|---|---|---|---|
| | 01FC | 995 | ; |
| | 01FC | 996 | ; We're not the VP owner. That means we have to extract the exception |
| | 01FC | 997 | ; information from the vector context area. Isn't this fun? |
| | 01FC | 998 | ; |
| 56 0150 C4 D0 | 01FC | 999 | 100$: MOVL PCB$L_VP_CONTEXT(R4),R6 ; Find vector context area |
| 04 A6 1C D3 | 0201 | 1000 | BITL #< VCTX$M_IVO ! - ; Test the various fault bits |
| | 0205 | 1001 | VCTX$M_PMF ! - ; If they're all clear, then |
| | 0205 | 1002 | VCTX$M_AEX>, - ; return a zero as an |
| | 0205 | 1003 | VCTX$L_FLAGS(R6) ; exception ID |
| 8F 13 | 0205 | 1004 | BEQL 3$ ; Return normal |
| | 0207 | 1005 | |
| 07 08 AC E9 | 0207 | 1006 | BLBC SAVE_EXC_FLAGS(AP),110$ ; Branch if noalloc flag cleared |
| | 020B | 1007 | ; |
| | 020B | 1008 | ; Noalloc flag specified. Simply reset the vector processor to clear |
| | 020B | 1009 | ; the vector exception state. |
| | 020B | 1010 | ; |
| 04 A6 1C CA | 020B | 1011 | BICL #<VCTX$M_IVO!- |
| | 020F | 1012 | VCTX$M_AEX!- |
| | 020F | 1013 | VCTX$M_PMF>,VCTX$L_FLAGS(R6) ; Clear exception state |
| FF84 31 | 020F | 1014 | BRW 3$ ; Join common exit code |
| | 0212 | 1015 | |
| | 0212 | 1016 | ; |
| | 0212 | 1017 | ; Save pending exceptions in exception block, and return exception id. |
| | 0212 | 1018 | ; |
| 0000025E'EF 16 | 0212 | 1019 | 110$: JSB ALLOC_VEXC ; Get an exception block |
| | 0218 | 1020 | |
| 18 A6 D0 | 0218 | 1021 | MOVL VCTX$L_VAER(R6),- ; Save the VAER |
| 14 A2 | 021B | 1022 | VEXC$L_SAVED_VAER(R2) |
| 10 A2 D4 | 021D | 1023 | CLRL VEXC$L_SAVED_VPSR(R2) ; and build a fake VPSR |
| | 0220 | 1024 | |
| 04 A6 10 D3 | 0220 | 1025 | BITL #VCTX$M_IVO,VCTX$L_FLAGS(R6) |
| 11 13 | 0224 | 1026 | BEQL 200$ |
| 10 A2 02000000 8F C8 | 0226 | 1027 | BISL #VPSR$M_IVO,VEXC$L_SAVED_VPSR(R2) |
| 04 A6 10 CA | 022E | 1028 | BICL #VCTX$M_IVO,VCTX$L_FLAGS(R6) |
| 1C A6 B0 | 0232 | 1029 | MOVW VCTX$W_IVO(R6),- |
| 0E A2 | 0235 | 1030 | VEXC$W_SAVED_IVO(R2) ; and the illegal opcode |
| 04 A6 08 D3 | 0237 | 1031 | 200$: BITL #VCTX$M_AEX,VCTX$L_FLAGS(R6) |
| 0C 13 | 023B | 1032 | BEQL 300$ |
| 10 A2 00000080 8F C8 | 023D | 1033 | BISL #VPSR$M_AEX,VEXC$L_SAVED_VPSR(R2) |
| 04 A6 08 CA | 0245 | 1034 | BICL #VCTX$M_AEX,VCTX$L_FLAGS(R6) |
| | 0249 | 1035 | |
| 04 A6 04 D3 | 0249 | 1036 | 300$: BITL #VCTX$M_PMF,VCTX$L_FLAGS(R6) |
| 0C 13 | 024D | 1037 | BEQL 400$ |
| 10 A2 00000040 8F C8 | 024F | 1038 | BISL #VPSR$M_PMF,VEXC$L_SAVED_VPSR(R2) |
| 04 A6 04 CA | 0257 | 1039 | BICL #VCTX$M_PMF,VCTX$L_FLAGS(R6) |
| | 025B | 1040 | |
| FF8B 31 | 025B | 1041 | 400$: BRW 30$ ; Join the main exit path |
| | 025E | 1042 | |
| | 025E | 1043 | |
| | 025E | 1044 | ; |
| | 025E | 1045 | ; Allocate a piece of memory for the vector exception block from non-paged |
| | 025E | 1046 | ; pool. In the event of an error, we let the RET clean up the stack. |

VP_SERVICES - Vector Processing System Services 4-OCT-1989 21:32:22 VAX MACRO T5.2V-4 Page A-6
X-8 $SAVE_VP_EXCEPTION - Save Vector Excepti 28-SEP-1989 13:13:17 [SYS.SRC]VP_SERVICES.MAR;1

| | | | |
|---|---|---|---|
| | 025E | 1047 | ; |
| | 025E | 1048 | |
| | 025E | 1049 | ALLOC_VEXC: |
| 51 1C D0 | 025E | 1050 | MOVL #VEXC$K_LENGTH,R1 ; Allocate an exception block. |
| 00000000'GF 16 | 0261 | 1051 | JSB G EXE$ALONONPAGED |
| 0E 50 E9 | 0267 | 1052 | BLBC R0,10$ ; Exit if no memory |
| | 026A | 1053 | |
| | 026A | 1054 | ASSUME VEXC$B_SUBTYPE EQ <VEXC$B_TYPE+1> |
| | 026A | 1055 | ASSUME VEXC$W_SAVED_IVO EQ <VEXC$W_CHECKSUM+2> |
| | 026A | 1056 | |
| 08 A2 51 B0 | 026A | 1057 | MOVW R1,VEXC$W_SIZE(R2) ; Store real size |
| 026D 8F B0 | 026E | 1058 | MOVW #<DYN$C_VP + <DYN$C_VP_VEXC*256> >,- ; Store type and subtype |
| 0A A2 | 0272 | 1059 | VEXC$B_TYPE(R2) |
| 0C A2 D4 | 0274 | 1060 | CLRL VEXC$W_CHECKSUM(R2) ; No checksum, clear the IVO |
| | 0277 | 1061 | ; word |
| 05 | 0277 | 1062 | RSB |
| | 0278 | 1063 | |
| | 0278 | 1064 | 10$: ENBINT |
| 50 0124 8F 3C | 027B | 1065 | MOVZWL #SS$_INSFMEM,R0 |
| 04 | 0280 | 1066 | RET |
| | 0281 | 1067 | |
| | 0281 | 1068 | |

APPENDIX B

RESTORE EXCEPTION STATE PRIMITIVE
Copyright C 1989 Digital Equipment Corporation VP_SERVICES - Vector Processing System Services 4-OCT-1989 21:32:22 VAX MACRO T5.2V-4 Page B-1
X-8 $RESTORE_VP_EXCEPTION - Restore Vector E 28-SEP-1989 13:13:17 [SYS.SRC]VP_SERVICES.MAR;1

```
                         00BF   631         .SBTTL $RESTORE_VP_EXCEPTION - Restore Vector Exception
                         00BF   632
                         00BF   633         ;++
                         00BF   634         ;
                         00BF   635         ; EXE$RESTORE_VP_EXCEPTION - Restore Vector Exception
                         00BF   636         ;
                         00BF   637         ; FUNCTIONAL DESCRIPTION:
                         00BF   638         ;
                         00BF   639         ; This service provides the capability to restore the exception state
                         00BF   640         ; of the vector processor. It performs some validation in the mode
                         00BF   641         ; of the caller, then issues the real Restore Vector Exception
                         00BF   642         ; systems service to do the actual work.
                         00BF   643         ;
                         00BF   644         ; INPUTS:
                         00BF   645         ;
                         00BF   646         ;
                         00BF   647         ; EXCID(AP) = address of a longword that contains the exception id.
                         00BF   648         ;
                         00BF   649         ; OUTPUTS:
                         00BF   650         ;
                         00BF   651         ; R0 = SS$_NORMAL - Normal successful completion.
                         00BF   652         ;
                         00BF   653         ; R0 = SS$_NOSAVPEXC - No saved exception for the given exception id.
                         00BF   654         ;
                         00BF   655         ; R0 = SS$_ACCVIO - The exception id longword cannot be read.
                         00BF   656         ;
                         00BF   657         ;--
                         00BF   658
                         00BF   659         DECLARE_PSECT EXEC$PAGED_CODE
                         013A   660
                         013A   661         SYSTEM_SERVICE RESTORE_VP_EXCEPTION,-
                         013A   662         <R2,R3,R4,R5>,-
                         013A   663         MODE=CALLERS_MODE,-
                         013A   664         NARG=1
                         013C   665
                         013C   666         ;
                         013C   667         ; This is an all-mode service, so arguments are not PROBEd and access
                         013C   668         ; violations can happen.
                         013C   669         ;
                         013C   670
        50 01 D0         013C   671         MOVL    #SS$_NORMAL,R0 ; Assume success status
6D 00000000'GF 9E        013F   672         MOVAB G EXE$SIGTORET,(FP) ; Establish handler
        53 04 AC D0      0146   673         MOVL    EXCID(AP),R3 ; Get the address of exception id
              63 D5      014A   674         TSTL    (R3) ; Is there an exception id?
              47 13      014C   675         BEQL    20$ ; Return quickly if zero
        50 2354 8F 3C    014E   676         MOVZWL  #SS$_NOSAVPEXC,R0 ; Set failure status
3B 00000000'GF E9        0153   677         BLBC G  CTL$GL_VP_FLAGS,20$ ; Branch if not a vector_VVIEF
                         015A   678         ; consumer
                         015A   679         ;
                         015A   680         ; Since the scalar/vector (memory) synchronization can cause vector exceptions
                         015A   681         ; to be reported, we want these exceptions to be reflected to the user. So,
                         015A   682         ; disable the condition handler established in this service.
                         015A   683         ;
                         015A   684
              6D D4      015A   685         CLRL    (FP) ; Disable handler
           51 04 31FD    015C   686         SYNC    R1 ; Synchronize
           51 05 31FD    0160   687         MSYNC   R1 ; with the vector processor
```

VP_SERVICES - Vector Processing System Services 4-OCT-1989 21:32:22 VAX MACRO T5.2V-4 Page B-2
X-8 $RESTORE_VP_EXCEPTION - Restore Vector E 28-SEP-1989 13:13:17 [SYS.SRC]VP_SERVICES.MAR;1

```
                         0164   688
55 00000000'GF D0        0164   689         MOVL G  CTL$GL_PHD,R5 ; Get PHD address
              08 E1      016B   690         BBC     #PHD$V_VP_CONSUMER,- ; Branch if not a vector
           0A 00AA C5    016D   691         PHD$W_FLAGS(R5),10$ ; consumer
                         0171   692
                         0171   693         $RESTORE_VP_EXC_INT_S EXCID = EXCID(AP) ; Call the real service
                         017B   694
              51 DC      017B   695         10$: MOVPSL R1 ; Is current mode = user ?
        03 51 02 18 ED   017D   696         CMPZV   #PSL$V_CURMOD,#PSL$S_CURMOD,R1,#PSL$C_USER
              11 12      0182   697         BNEQ    20$ ; IF NEQ no, don't call VVIEF
52 00000000'GF D0        0184   698         MOVL G  CTL$GL_VVIEF_ADDR,R2 ; Get the address of VVIEF
              08 13      018B   699         BEQL    20$ ; If EQL, not there
           50 05 D0      018D   700         MOVL    #VVIEF$K_RESTORE_VP_EXCEPTION,R0 ; Get the VVIEF action code
           51 63 D0      0190   701         MOVL    (R3),R1 ; Get the exception id
              62 16      0193   702         JSB     (R2) ; Notify VVIEF
                         0195   703
                 04      0195   704         20$: RET ; Back to the caller
                         0196   705
```

APPENDIX B-continued

RESTORE EXCEPTION STATE PRIMITIVE
Copyright C 1989 Digital Equipment Corporation VP_SERVICES - Vector Processing System Services 4-OCT-1989 21:32:22 VAX MACRO T5.2V-4 Page B-3
X-8 $RESTORE_VP_EXC_INT - Internal form 28-SEP-1989 13:13:17 [SYS.SRC]VP_SERVICES.MAR;1

```
                    0196    707     .SBTTL -- $RESTORE_VP_EXC_INT - Internal form
                    0196    708
                    0196    709     ;++
                    0196    710     ;
                    0196    711     ; EXE$RESTORE_VP_EXC_INT - Restore Vector Exception internal form
                    0196    712     ;
                    0196    713     ; FUNCTIONAL DESCRIPTION:
                    0196    714     ;
                    0196    715     ; This service provides the capability to restore the exception state of
                    0196    716     ; the vector processor.
                    0196    717     ;
                    0196    718     ; INPUTS:
                    0196    719     ;
                    0196    720     ; EXCID(AP) = address of a longword that contains the exception id.
                    0196    721     ;
                    0196    722     ; R4 = current process PCB address.
                    0196    723     ;
                    0196    724     ; OUTPUTS:
                    0196    725     ;
                    0196    726     ; R0 = SS$_NORMAL - Normal successful completion
                    0196    727     ;
                    0196    728     ; R0 = SS$_NOSAVPEXC - No saved exception for the given exception id.
                    0196    729     ;
                    0196    730     ; R0 = SS$_ACCVIO - The exception id longword cannot be read.
                    0196    731     ;
                    0196    732     ;--
                    0196    733
                    0196    734     DECLARE_PSECT EXEC$NONPAGED_CODE
                    00BF    735
                    00BF    736     SYSTEM_SERVICE RESTORE_VP_EXC_INT,-
                    00BF    737     <R2,R3,R4,R5,R6>,-
                    00BF    738     MODE=KERNEL,-
                    00BF    739     NARG=1
                    00C1    740
53 04 AC D0         00C1    741     MOVL EXCID(AP),R3 ; Address of the exception id
                    00C5    742     IFNORD #4,(R3),200$ ; Make sure it can be read
   53 63 D0         00CB    743     MOVL (R3),R3 ; Get the exception id
      70 13         00CE    744     BEQL 50$ ; If it's zero, then no
                    00D0    745     ; exception was saved.
                    00D0    746     IFNORD #4,(R3),200$ ; Make sure the id can be read
                    00D6    747
55 00000000'GF D0   00D6    748     MOVL G CTL$GL_PHD,R5 ; Get PHD address
         08 E1      00DD    749     BBC #PHD$V_VP_CONSUMER,- ; Branch if not a vector
   61 00AA C5       00DF    750     PHD$W_FLAGS(R5),100$ ; consumer
                    00E3    751
                    00E3    752
                    00E3    753     ;
                    00E3    754     ; Find out if this is our saved exception.
                    00E3    755     ;
56 0150 C4 D0       00E3    756     MOVL PCB$L_VP_CONTEXT(R4),R6 ; Get the vector context area.
55 10 A6 D0         00E8    757     MOVL VCTX$L_VEXCFL(R6),R5 ; Search the exception list
   52 65 D0         00EC    758     MOVL (R5),R2 ; for something that matches
                    00EF    759     ; this ID.
                    00EF    760
   53 52 D1         00EF    761     5$: CMPL R2,R3 ; Is this our exception ID?
      0A 13         00F2    762     BEQL 10$ ; Continue the service.
   55 52 D1         00F4    763     CMPL R2,R5 ; Hit the end of the list?
```

VP_SERVICES - Vector Processing System Services 4-OCT-1989 21:32:22 VAX MACRO T5.2V-4 Page B-4
X-8 $RESTORE_VP_EXC_INT - Internal form 28-SEP-1989 13:13:17 [SYS.SRC]VP_SERVICES.MAR;1

```
      4B 13         00F7    764     BEQL 100$ ; if EQL yes, error
   52 62 D0         00F9    765     MOVL (R2),R2 ; Move down the list
      F1 11         00FC    766     BRB 5$
                    00FE    767
                    00FE    768     ;
                    00FE    769     ; Restore the exception state for the given exception id.
                    00FE    770     ;
                    00FE    771     10$: DSBINT #IPL$_RESCHED,- ; Go to ASTDEL
                    00FE    772     ENVIRON=UNIPROCESSOR
                    0104    773
   51 63 0F         0104    774     REMQUE (R3),R1 ; Remove the block from the
                    0107    775     ;queue.
                    0107    776     FIND_CPU_DATA R5 ; Get address of per-CPU database
54 033C C5 D1       0111    777     CMPL CPU$L_VP_OWNER(R5),R4 ; Do we own the VP?
      06 12         0116    778     BNEQ 20$ ; if NEQ no
00000000'GF 16      0118    779     JSB G EXE$VP_DISABLE ; Disable the vector processor
                    011E    780
1C A6 0E A3 B0      011E    781     20$: MOVW VEXC$W_SAVED_IVO(R3),VCTX$W_IVO(R6) ;Restore IVO opcode.
```

APPENDIX B-continued

RESTORE EXCEPTION STATE PRIMITIVE
Copyright C 1989 Digital Equipment Corporation

| | | | |
|---|---|---|---|
| 04 13 | 0123 | 782 | BEQL 30$ |
| | 0125 | 783 | |
| 04 A6 10 C8 | 0125 | 784 | BISL #VCTX$M_IVO,VCTX$L_FLAGS(R6) ; Set the flag |
| | 0129 | 785 | |
| 14 A3 D0 | 0129 | 786 | 30$: MOVL VEXC$L_SAVED_VAER(R3),- ; Restore Arithmethic exceptions |
| 18 A6 | 012C | 787 | VCTX$L_VAER(R6) |
| 04 13 | 012E | 788 | BEQL 40$ ; Set flag if necessary |
| 04 A6 08 C8 | 0130 | 789 | BISL #VCTX$M_AEX, VCTX$L_FLAGS(R6) |
| | 0134 | 790 | |
| 50 53 D0 | 0134 | 791 | 40$: MOVL R3,R0 ; Deallocate the packet |
| 00000000'GF 16 | 0137 | 792 | JSB G EXE$DEANONPAGED |
| | 013D | 793 | ENBINT |
| | 0140 | 794 | |
| 50 01 3C | 0140 | 795 | 50$: MOVZWL #SS$_NORMAL,R0 ; Set success status |
| 04 | 0143 | 796 | RET |
| | 0144 | 797 | |
| 50 2354 8F 3C | 0144 | 798 | 100$: MOVZWL #SS$_NOSAVPEXC,R0 ; No saved pending exception |
| 04 | 0149 | 799 | RET |
| | 014A | 800 | |
| 50 0C 3C | 014A | 801 | 200$: MOVZWL #SS$_ACCVIO,R0 ; Set failure status |
| 04 | 014D | 802 | RET |
| | 014E | 803 | |

APPENDIX C

SAVE VECTOR PROCESSOR STATE
Copyright C 1989 Digital Equipment Corporation

VP_SERVICES - Vector Processing System Services 4-OCT-1989 21:32:22 VAX MACRO T5.2V-4 Page C-1
X-8 SAVE_INTO_VSB - Save VP state into VSB 28-SEP-1989 13:13:17 [SYS.SRC]VP_SERVICES.MAR;1

| | | | | |
|---|---|---|---|---|
| | | 0400 | 1639 | .SBTTL SAVE_INTO_VSB - Save VP state into VSB |
| | | 0400 | 1640 | |
| | | 0400 | 1641 | ;++ |
| | | 0400 | 1642 | ; |
| | | 0400 | 1643 | ; SAVE_INTO_VSB - Save VP state into VSB |
| | | 0400 | 1644 | ; |
| | | 0400 | 1645 | ; FUNCTIONAL DESCRIPTION: |
| | | 0400 | 1646 | ; |
| | | 0400 | 1647 | ; This routine saves the vector state into a given VSB. After |
| | | 0400 | 1648 | ; the vector state is saved into the VSB, pages in the VSB are |
| | | 0400 | 1649 | ; set to user-read, to protect accidental corruption. |
| | | 0400 | 1650 | ; |
| | | 0400 | 1651 | ; Note that this is only done as a safe guard, as the user may |
| | | 0400 | 1652 | ; change the page protection to user-write and scribble over |
| | | 0400 | 1653 | ; the saved vector state. But since the image is destroying its |
| | | 0400 | 1654 | ; own context and that's what the image really wants to do, |
| | | 0400 | 1655 | ; then more power to it! |
| | | 0400 | 1656 | ; |
| | | 0400 | 1657 | ; CALLING SEQUENCE: |
| | | 0400 | 1658 | ; |
| | | 0400 | 1659 | ; CALLS/CALLG |
| | | 0400 | 1660 | ; |
| | | 0400 | 1661 | ; INPUTS: |
| | | 0400 | 1662 | ; |
| | | 0400 | 1663 | ; 00(AP) = Argument count |
| | | 0400 | 1664 | ; 04(AP) = Address of the VSB address |
| | | 0400 | 1665 | ; |
| | | 0400 | 1666 | ; OUTPUTS: |
| | | 0400 | 1667 | ; |
| | | 0400 | 1668 | ; R0 = SS$_NORMAL, successful completion |
| | | 0400 | 1669 | ; |
| | | 0400 | 1670 | ; R0 = SS$_ACCVIO, failure to write into the VSB |
| | | 0400 | 1671 | ; |
| | | 0400 | 1672 | ; R0 = Failure status from $SAVE_VP_EXCEPTION |
| | | 0400 | 1673 | ; |
| | | 0400 | 1674 | ;-- |
| | | 0400 | 1675 | |
| | | 0400 | 1676 | DECLARE_PSECT EXEC$PAGED_CODE |
| | | 0400 | 1677 | SAVE_INTO_VSB: |
| | 0004 | 0400 | 1678 | .WORD M<R2> |
| 6D 00000000'GF 9E | | 0402 | 1679 | MOVAB G EXE$SIGTORET,(FP) ; Establish condition handler |
| 52 04 BC D0 | | 0409 | 1680 | MOVL @VSBADR_PTR(AP),R2 ; Get VSB address |
| | | 040D | 1681 | |
| | | 040D | 1682 | $SAVE_VP_EXCEPTION_S - |
| | | 040D | 1683 | EXCID = VSB$L_EXCID(R2) ; Save vector exception state |
| 01 50 E8 | | 0419 | 1684 | BLBS R0,10$ ; If successful, continue |
| 04 | | 041C | 1685 | RET |
| | | 041D | 1686 | |
| 50 00 31FD | | 041D | 1687 | 10$: MFVCR R0 ; Get VCR |

APPENDIX C-continued

SAVE VECTOR PROCESSOR STATE
Copyright C 1989 Digital Equipment Corporation

| | | | | |
|---|---|---|---|---|
| 14 A2 50 90 | | 0421 | 1688 | MOVB R0,VSB$B_VCR(R2) ; Save VCR |
| | | 0425 | 1689 | |
| 50 01 31FD | | 0425 | 1690 | MFVLR R0 ; Get VLR |
| 15 A2 50 90 | | 0429 | 1691 | MOVB R0,VSB$B_VLR(R2) ; Save VLR |
| | | 042D | 1692 | |
| 18 A2 02 31FD | | 042D | 1693 | MFVMRLO VSB$Q_VMR(R2) ; Get VMR low portion |
| 1C A2 03 31FD | | 0432 | 1694 | MFVMRHI VSB$Q_VMR+4(R2) ; Get VMR low portion |
| | | 0437 | 1695 | |

VP_SERVICES - Vector Processing System Services 4-OCT-1989 21:32:22 VAX MACRO T5.2V-4 Page C-2
X-8 SAVE_INTO_VSB - Save VP state into VSB 28-SEP-1989 13:13:17 [SYS.SRC]VP_SERVICES.MAR;1

| | | | |
|---|---|---|---|
| 00000040 8F 01 A9FD | 0437 | 1696 | MTVLR #64 ; Set VLR to 64 |
| 08 20 A2 0000 8F 9EFD | 043F | 1697 | VSTQ V0,VSB$R_V0(R2),S #8 ; Store V0 |
| 08 0220 C2 0001 8F 9EFD | 0447 | 1698 | VSTQ V1,VSB$R_V1(R2),S #8 ; Store V1 |
| 08 0420 C2 0002 8F 9EFD | 0450 | 1699 | VSTQ V2,VSB$R_V2(R2),S #8 ; Store V2 |
| 08 0620 C2 0003 8F 9EFD | 0459 | 1700 | VSTQ V3,VSB$R_V3(R2),S #8 ; Store V3 |
| 08 0820 C2 0005 8F 9EFD | 0462 | 1701 | VSTQ V4,VSB$R_V4(R2),S #8 ; Store V4 |
| 08 0A20 C2 0005 8F 9EFD | 046B | 1702 | VSTQ V5,VSB$R_V5(R2),S #8 ; Store V5 |
| 08 0C20 C2 0006 8F 9EFD | 0474 | 1703 | VSTQ V6,VSB$R_V6(R2),S #8 ; Store V6 |
| 08 0E20 C2 0007 8F 9EFD | 047D | 1704 | VSTQ V7,VSB$R_V7(R2),S #8 ; Store V7 |
| 08 1020 C2 0008 8F 9EFD | 0486 | 1705 | VSTQ V8,VSB$R_V8(R2),S #8 ; Store V8 |
| 08 1220 C2 0009 8F 9EFD | 048F | 1706 | VSTQ V9,VSB$R_V9(R2),S #8 ; Store V9 |
| 08 1420 C2 000A 8F 9EFD | 0498 | 1707 | VSTQ V10,VSB$R_V10(R2),S #8 ; Store V10 |
| 08 1620 C2 000B 8F 9EFD | 04A1 | 1708 | VSTQ V11,VSB$R_V11(R2),S #8 ; Store V11 |
| 08 1820 C2 000C 8F 9EFD | 04AA | 1709 | VSTQ V12,VSB$R_V12(R2),S #8 ; Store V12 |
| 08 1A20 C2 000D 8F 9EFD | 04B3 | 1710 | VSTQ V13,VSB$R_V13(R2),S #8 ; Store V13 |
| 08 1C20 C2 000E 8F 9EFD | 04BC | 1711 | VSTQ V14,VSB$R_V14(R2),S #8 ; Store V14 |
| 08 1E20 C2 000F 8F 9EFD | 04C5 | 1712 | VSTQ V15,VSB$R_V15(R2),S #8 ; Store V15 |
| | 04CE | 1713 | |
| 50 04 31FD | 04CE | 1714 | SYNC R0 ; Ensure no exceptions |
| 50 05 31FD | 04D2 | 1715 | MSYNC R0 ; Ensure memory activity completion |
| | 04D6 | 1716 | |
| 50 52 000020A0 8F C1 | 04D6 | 1717 | ADDL3 #VSB$K_LENGTH,R2,R0 ; Calculate VSB ending address |
| 50 DD | 04DE | 1718 | PUSHL R0 ; Set ending address |
| 0200 C2 9F | 04E0 | 1719 | PUSHAB 512(R2) ; Set starting address at 2nd page |
| 50 5E D0 | 04E4 | 1720 | MOVL SP,R0 ; Get address of inadr |
| | 04E7 | 1721 | $SETPRT_S - |
| | 04E7 | 1722 | INADR = (R0),- ; Set protection to user read |
| | 04E7 | 1723 | PROT = #PRT$C_UR ; (note: failure ignored) |
| 50 01 D0 | 04F8 | 1724 | MOVL #SS$_NORMAL,R0 ; Set success status |
| 04 | 04FB | 1725 | RET |
| | 04FC | 1726 | |
| | 04FC | 1727 | |

VP_SERVICES - Vector Processing System Services 4-OCT-1989 21:32:22 VAX MACRO T5.2V-4 Page C-3
X-8 RESTORE_FROM_VSB - Restore Vector state 28-SEP-1989 13:13:17 [SYS.SRC]VP_SERVICES.MAR;1

| | | |
|---|---|---|
| 04FC | 1729 | .SBTTL RESTORE_FROM_VSB - Restore Vector State from VSB |
| 04FC | 1730 | |
| 04FC | 1731 | ;++ |
| 04FC | 1732 | ; |
| 04FC | 1733 | ; RESTORE_FROM_VSB - Restore Vector State from VSB |
| 04FC | 1734 | ; |
| 04FC | 1735 | ; FUNCTIONAL DESCRIPTION: |
| 04FC | 1736 | ; |
| 04FC | 1737 | ; This routine restores the vector state into a given VSB. |
| 04FC | 1738 | ; The VSB is deallocated to the lookaside list and the VSB |
| 04FC | 1739 | ; poiter zeroed. |
| 04FC | 1740 | ; |
| 04FC | 1741 | ; CALLING SEQUENCE: |
| 04FC | 1742 | ; |
| 04FC | 1743 | ; CALLS/CALLG |
| 04FC | 1744 | ; |
| 04FC | 1745 | ; INPUTS: |
| 04FC | 1746 | ; |
| 04FC | 1747 | ; 00(AP) = Argument count |
| 04FC | 1748 | ; 04(AP) = Address of the VSB address |
| 04FC | 1749 | ; |
| 04FC | 1750 | ; OUTPUTS: |
| 04FC | 1751 | ; |
| 04FC | 1752 | ; R0 = SS$_NORMAL, successful completion |
| 04FC | 1753 | ; |
| 04FC | 1754 | ; R0 = SS$_BADCONTEXT, VSB corrupted |
| 04FC | 1755 | ; |
| 04FC | 1756 | ; R0 = SS$_ACCVIO, failure to read from the VSB |
| 04FC | 1757 | ; |
| 04FC | 1758 | ; IMPLICIT OUTPUT: |
| 04FC | 1759 | ; |
| 04FC | 1760 | ; VSB pointer cleared. |
| 04FC | 1761 | ; |
| 04FC | 1762 | ;-- |
| 04FC | 1763 | |

APPENDIX C-continued

SAVE VECTOR PROCESSOR STATE
Copyright © 1989 Digital Equipment Corporation

|  |  |  | 04FC | 1764 | DECLARE_PSECT EXEC$PAGED_CODE |
|---|---|---|---|---|---|
|  |  |  | 04FC | 1765 | RESTORE_FROM_VSB: |
|  |  | 0004 | 04FC | 1766 | .WORD M<R2> |
| 6D 0000'0000'GF | 9E |  | 04FE | 1767 | MOVAB G^EXE$SIGTORET,(FP) ; Establish condition handler |
| 52 04 BC | D0 |  | 0505 | 1768 | MOVL @VSBADR_PTR(AP),R2 ; Get VSB address |
| 51 52 | D0 |  | 0509 | 1769 | MOVL R2,R1 ; Copy VSB address |
| 00D8 | 30 |  | 050C | 1770 | BSBW VERIFY_VSB_HEADER ; Verify VSB header information |
| 04 50 | E8 |  | 050F | 1771 | BLBS R0,10$ ; Continue if successful |
| 04 BC | D4 |  | 0512 | 1772 | CLRL @VSBADR_PTR(AP) ; Clear VSBADR pointer |
|  | 04 |  | 0515 | 1773 | RET ; Else, return with failure status |
|  |  |  | 0516 | 1774 |  |
| 00000040 8F 01 | A9FD |  | 0516 | 1775 | 10$: MTVLR #64 ; Set VLR to 64 |
| 08 20 A2 0000 8F | 36FD |  | 051E | 1776 | VLDQ VSB$R_V0(R2),S #8,V0 ; Load V0 |
| 08 0220 C2 0001 8F | 36FD |  | 0526 | 1777 | VLDQ VSB$R_V1(R2),S #8,V1 ; Load V1 |
| 08 0420 C2 0002 8F | 36FD |  | 052F | 1778 | VLDQ VSB$R_V2(R2),S #8,V2 ; Load V2 |
| 08 0620 C2 0003 8F | 36FD |  | 0538 | 1779 | VLDQ VSB$R_V3(R2),S #8,V3 ; Load V3 |
| 08 0820 C2 0004 8F | 36FD |  | 0541 | 1780 | VLDQ VSB$R_V4(R2),S #8,V4 ; Load V4 |
| 08 0A20 C2 0005 8F | 36FD |  | 054A | 1781 | VLDQ VSB$R_V5(R2),S #8,V5 ; Load V5 |
| 08 0C20 C2 0006 8F | 36FD |  | 0553 | 1782 | VLDQ VSB$R_V6(R2),S #8,V6 ; Load V6 |
| 08 0E20 C2 0007 8F | 36FD |  | 055C | 1783 | VLDQ VSB$R_V7(R2),S #8,V7 ; Load V7 |
| 08 1020 C2 0008 8F | 36FD |  | 0565 | 1784 | VLDQ VSB$R_V8(R2),S #8,V8 ; Load V8 |
| 08 1220 C2 0009 8F | 36FD |  | 056E | 1785 | VLDQ VSB$R_V9(R2),S #8,V9 ; Load V9 |

VP_SERVICES - Vector Processing System Services 4-OCT-1989 21:32:22 VAX MACRO T5.2V-4 Page C-4
X-8 RESTORE_FROM_VSB - Restore Vector state 28-SEP-1989 13:13:17 [SYS.SRC]VP_SERVICES.MAR;1

| 08 1420 C2 000A 8F | 36FD |  | 0577 | 1786 | VLDQ VSB$R_V10(R2),S #8,V10 ; Load V10 |
|---|---|---|---|---|---|
| 08 1620 C2 000B 8F | 36FD |  | 0580 | 1787 | VLDQ VSB$R_V11(R2),S #8,V11 ; Load V11 |
| 08 1820 C2 000C 8F | 36FD |  | 0589 | 1788 | VLDQ VSB$R_V12(R2),S #8,V12 ; Load V12 |
| 08 1A20 C2 000D 8F | 36FD |  | 0592 | 1789 | VLDQ VSB$R_V13(R2),S #8,V13 ; Load V13 |
| 08 1C20 C2 000E 8F | 36FD |  | 059B | 1790 | VLDQ VSB$R_V14(R2),S #8,V14 ; Load V14 |
| 08 1E20 C2 000F 8F | 36FD |  | 05A4 | 1791 | VLDQ VSB$R_V15(R2),S #8,V15 ; Load V15 |
|  |  |  | 05AD | 1792 |  |
| 50 14 A2 | 9A |  | 05AD | 1793 | MOVZBL VSB$B_VCR(R2),R0 ; Get VCR |
| 50 00 | A9FD |  | 05B1 | 1794 | MTVCR R0 ; Set VCR |
|  |  |  | 05B5 | 1795 |  |
| 50 15 A2 | 9A |  | 05B5 | 1796 | MOVZBL VSB$B_VLR(R2),R0 ; Get VCR |
| 50 01 | A9FD |  | 05B9 | 1797 | MTVLR R0 ; Set VLR |
|  |  |  | 05BD | 1798 |  |
| 18 A2 02 | A9FD |  | 05BD | 1799 | MTVMRLO VSB$Q_VMR(R2) ; Set VMR low portion |
| 1C A2 03 | A9FD |  | 05C2 | 1800 | MTVMRHI VSB$Q_VMR+4(R2) ; Set VMR high portion |
|  |  |  | 05C7 | 1801 |  |
| 50 04 | 31FD |  | 05C7 | 1802 | SYNC R0 ; Ensure no exceptions |
| 50 05 | 31FD |  | 05CB | 1803 | MSYNC R0 ; Ensure memory activity completion |
|  |  |  | 05CF | 1804 |  |
|  |  |  | 05CF | 1805 | $RESTORE_VP_EXCEPTION_S - |
|  |  |  | 05CF | 1806 | EXCID = VSB$L_EXCID(R2) ; Restore VP exception state |
|  |  |  | 05D9 | 1807 |  |
| 0000'0000'GF 62 | 0E |  | 05D9 | 1808 | INSQUE (R2),G^CTL$GQ_VSBLIST ; Insert VSB into lookaside list |
| 04 BC | D4 |  | 05E0 | 1809 | CLRL @VSBADR_PTR(AP) ; Clear VSBADR pointer |
| 50 01 | D0 |  | 05E3 | 1810 | MOVL #SS$_NORMAL,R0 ; Set success status |
|  | 04 |  | 05E6 | 1811 | RET |
|  |  |  | 05E7 | 1812 |  |
|  |  |  | 05E7 | 1813 |  |

What is claimed is:

1. A method for handling a delayed exception generated by a coprocessor in a data processing system, said data processing system also including a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) operating said main processor and said coprocessor on said asynchronous basis to execute instructions in a first code thread including an instruction that, when executed, causes said coprocessor to generate said delayed exception; and then (b) synchronizing the coprocessor with the main processor such that the main processor does not process any further instructions until all instructions have been issued to the coprocessor are guaranteed to complete without causing additional exceptions; and then (c) saving a pending state of said delayed exception into memory; and then (d) clearing said coprocessor of the state of said delayed exception; and then (e) operating said main processor and said coprocessor on said asynchronous basis to execute a second code thread; and then (f) again synchronizing said coprocessor with said main processor; and then (g) disabling the use of said coprocessor; and then (h) operating the main processor to execute instructions in said first code thread until a coprocessor disabled exception occurs when said main processor issues an instruction to the disabled coprocessor; and then (i) reporting to said first code thread the presence of the pending state of said delayed exception having been saved in memory; and then (j) enabling said coprocessor; and then (k) again operating said main processor and said coprocessor on said asynchronous basis to execute instructions in said first code thread.

2. The method as claimed in claim 1, wherein the coprocessor includes means for executing vector instructions.

3. The method as claimed in claim 2, wherein the delayed exception is a vector arithmetic exception.

4. A method for handling a delayed exception generated by a coprocessor in a data processing system, said data processing system also including a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) operating said main processor and said coprocessor on said asynchronous basis to execute instructions in a first code thread including an instruction that, when executed, causes said coprocessor to generate said delayed exception; and then (b) disabling the use of said coprocessor; and then (c) operating said main processor to execute instructions in at least a second code thread until a coprocessor disabled exception occurs when said main processor issues an instruction to the disabled coprocessor; and then (d) synchronizing the coprocessor with the main processor such that the main processor does not process any further instructions until all instructions having been issued to the coprocessor are guaranteed to complete without causing additional exceptions; and the (e) saving a pending state of said delayed exception from the first code thread into memory allocated to said first code thread; and then (f) clearing said coprocessor of the state of said delayed exception; and then (g) operating said main processor and said coprocessor on said asynchronous basis to execute instructions in the second code thread; and then (h) disabling the use of said coprocessor; and then (i) operating said main processor to execute instructions in said first code thread until a coprocessor disabled exception occurs when said main processor issues an instruction to the disabled coprocessor; and then (j) reporting to said first code thread the presence of the pending state of said delayed exception having been saved in memory; and then (k) enabling said coprocessor; and then (l) again operating said main processor and said coprocessor on said asynchronous basis to execute instructions in said first code thread.

5. The method as claimed in claim 4, wherein the coprocessor includes means for executing vector instructions.

6. The method as claimed in claim 5, wherein said delayed exception is a vector arithmetic exception.

7. A method for saving exception state information about delayed exceptions having been generated by a coprocessor in a data processing system during execution of instructions in a code thread, said coprocessor having a register for holding the exception state information, said data processing system also including a memory for receiving and holding the exception state information from said register, and a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) operating said main processor and said coprocessor on said asynchronous basis to execute instructions in said code thread; and then (b) synchronizing the coprocessor with the main processor such that the main processor does not process any further instructions of said code thread until all instructions having been issued to the coprocessor are guaranteed to complete without causing additional exceptions; and (c) upon completion of said synchronizing of the coprocessor with the main processor, (i) checking whether the exception state information held in said register indicates a pending exception having been generated by execution of at least one of said instructions in said code thread, and when a pending exception is so indicated, transferring the exception state information from said register to a save area of said memory, and clearing the exception state information from said register; and (ii) checking whether exception state information held in a thread descriptor area of said memory allocated to said code thread indicates a pending exception having been generated by execution by said coprocessor of at least one of said instructions in said code thread, and when a pending exception is so indicated, transferring that exception state information from said thread descriptor area of said memory to said save area of said memory, and clearing that exception state information from said thread descriptor area of said memory.

8. The method as claimed in claim 7, wherein the coprocessor includes means for executing vector instructions.

9. The method as claimed in claim 8, wherein the exceptions include vector arithmetic exceptions.

10. A method for reporting delayed exceptions having been generated by a coprocessor in a data processing system during execution of instructions in a code thread, said data processing system also including a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) disabling said coprocessor;

(b) when said coprocessor is disabled, operating the main processor to execute instructions in said code thread until a coprocessor disabled exception occurs when said main processor issues an instruction to the disabled coprocessor;

(c) in response to said coprocessor disabled exception, (i) checking whether exception state information saved in thread descriptor memory allocated to said code thread indicates a pending exception, and when a pending exception is so indicated, reporting the presence of the pending exception to said code thread and clearing the exception state information saved in the thread descriptor memory;

(ii) checking whether exception state information held in a coprocessor register indicates a pending exception, and when a pending exception is so indicated, reporting the presence of the pending exception to said code thread and clearing said coprocessor register; and (iii) enabling said coprocessor.

11. The method as claimed in claim 10, wherein the coprocessor includes means for executing vector instructions.

12. The method as claimed in claim 11, wherein the exceptions include vector arithmetic exceptions.

13. A method for restoring saved state information about a delayed exception having been generated by a coprocessor in a data processing system while executing instructions in a first code thread, said data processing system also including a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) synchronizing the coprocessor with the main processor such that the main processor does not process any further instructions in a second code thread until all instructions having been issued to the coprocessor are guaranteed to complete without causing additional exceptions; and (b) after the coprocessor has been synchronized with the main processor;

(i) disabling the use of said coprocessor;

(ii) checking whether exception state information in the coprocessor indicates a pending exception, and when a pending exception is so indicated, reporting the presence of said pending exception to said second code thread and clearing the exception state information in the coprocessor;

(iii) checking whether a coprocessor exception is indicated by exception state information in a thread descriptor area of memory allocated to said first code thread, and when an exception is so indicated, reporting the presence of the pending exception to said first code thread and clearing the exception state information in the thread descriptor; and (iv) moving saved state information about said delayed exception from a save area of memory into a thread descriptor area of memory allocated to said first code thread.

14. The method as claimed in claim 13, wherein the coprocessor includes means for executing vector instructions.

15. The method as claimed in claim 14, wherein said delayed exception is a vector arithmetic exception.

16. A method for reporting saved state information about a delayed exception having been generated by a coprocessor in a data processing system during execution of a code thread, said data processing system also including a main processor that issues instructions to said coprocessor, said coprocessor being capable of operating on an asynchronous basis with respect to said main processor such that the coprocessor executes issued instructions simultaneously while the main processor executes further instructions, said method comprising the steps of:

(a) operating the main processor, with the coprocessor disabled, to execute instructions in said code thread until a coprocessor disabled exception occurs when the main processor issues an instruction to the disabled coprocessor; and (b) then checking whether exception state information in code thread descriptor memory allocated to said code thread indicates that said delayed exception is pending, and when said delayed exception is so indicated, reporting to said code thread that said delayed exception is pending.

17. The method as claimed in claim 16, wherein the coprocessor includes means for executing vector instructions.

18. The method as claimed in claim 17, wherein the delayed exception is a vector arithmetic exception.

19. A method of operating a data processing system including a coprocessor and a main processor that issues instructions to said coprocessor, said coprocessor being capable of operating on an asynchronous basis with respect to said main processor such that the coprocessor executes issued instructions simultaneously while the main processor executes further instructions, said coprocessor generating exceptions during the asynchronous operation, the exceptions being indicated by exception state information held in said coprocessor, said method comprising the steps of:

(a) allocating respective thread descriptor memory locations to code threads including the instructions executed by the coprocessor and the main processor;

(b) operating said coprocessor on said asynchronous basis with respect to said main processor;

(c) identifying one of said code threads as a coprocessor-owner code thread which includes instructions that were last executed by said coprocessor;

(d) identifying a current code thread having instructions that are currently being executed by said main processor; and (e) saving exception state information pertaining to said current code thread by:

(1) checking whether the current code thread is also the coprocessor-owner code thread; and when it is, synchronizing the coprocessor with the main processor such that the main processor does not process any further instructions until all instructions having been issued to the coprocessor are guaranteed to complete without causing additional exceptions, and then checking whether an exception is indicated by the exception state information held in the coprocessor, and when an exception is so indicated, transferring the exception state information to a respective save area of memory and clearing the exception indication from the exception state information held in the coprocessor; and (2) checking whether exception state information held in the thread descriptor memory allocated to the current code thread indicates a coprocessor exception pertinent to the current code thread; and when such an exception is so indicated, transferring that exception state information from the thread descriptor memory allocated to the current code thread to said save area of memory and clearing that exception indication form the exception state information held in the thread descriptor memory allocated to the current code thread; wherein said steps (c), (d)

and (e) are repeated during the execution of a plurality of code threads.

20. The method of operating the data processing system as claimed in claim 19, further comprising a step (f) of restoring the exception state information saved in said save area of memory by:
(1) identifying a respective code thread to have its saved exception state information restored;
(2) checking whether said respective code thread is the coprocessor-owner code thread; and when it is, synchronizing the coprocessor with the main processor such that the main processor does not process any further instructions until all instructions having been issued to the coprocessor are guaranteed to complete without causing additional exceptions, then checking whether an exception is indicated by the exception state information held in the coprocessor, and when an exception is so indicated, reporting and clearing the exception indication from the exception state information held in the coprocessor;
(3) checking whether a coprocessor exception is indicated by exception state information held in the thread descriptor memory allocated to said respective code thread, and when an exception is so indicated, reporting the exception indication to said respective code thread form the exception sate information held in the thread descriptor memory allocated to said respective code thread and clearing the exception indication from the exception state information held in the thread descriptor memory allocated to said respective code thread; and
(4) transferring the saved exception state information for said respective code thread from said save area to the thread descriptor memory allocated to said respective code thread.

21. The method of operating the data processing system as claimed in claim 20, further comprising disabling the coprocessor after it is synchronized in each of steps (e)(1) and (f)(2), and further comprising the step (g) of reporting a coprocessor exception for the coprocessor-owner code thread to said coprocessor-owner code thread when the main processor issues a coprocessor instruction and the coprocessor is disabled, the coprocessor exception being reported by:
(1) checking whether an exception is indicated by the exception state information held in the coprocessor, and when an exception is so indicated, reporting and clearing the exception indication from the exception state information held in the coprocessor;
(2) checking whether a coprocessor exception is indicated by exception state information in the thread descriptor memory allocated to the coprocessor-owner code thread, and when an exception is so indicated, reporting the exception indication to said coprocessor-owner code thread from the exception state information in the thread descriptor memory allocated tot he coprocessor-owner code thread and clearing the exception indication from the exception state information in the thread descriptor memory allocated to the coprocessor-owner code thread.

22. A data processing system comprising:
(a) a main processor including means for executing instructions, wherein said mean for executing instruction includes means for issuing coprocessor instructions;
(b) a coprocessor coupled to said main processor to receive the issued coprocessor instructions, said coprocessor including means for executing said coprocessor instructions on an asynchronous basis with respect to said main processor such that the coprocessor executes issued coprocessor instructions simultaneously while the main processor executes further instructions; said means for executing coprocessor instructions including means for generating coprocessor exceptions; and coprocessor further including means for disabling execution of further issued coprocessor instructions in response to a coprocessor exception, and means for transmitting to said main processor a coprocessor disabled fault signal upon receipt of a coprocessor instruction issued form said main processor when execution of further issued coprocessor instructions is disabled; said coprocessor being coupled to said main processor for transmission of said disabled fault signal from said coprocessor to said main processor and for permitting said main processor to read exception state information from said coprocessor;
wherein said main processor includes exception reporting means for reporting said exception state information to a code thread having an instruction having caused said exception to be generated when said instruction is executed by said coprocessor, said exception reporting means including:
(i) disabled fault processing means responsive to said disabled fault signal for reporting said exception information to said code thread from a thread descriptor area of memory allocated to said code thread when said exception is indicated in said thread descriptor during execution of said code thread by said main processor, and when said exception information is not indicated in said thread descriptor area of memory during execution of said code thread by said main processor, reporting said exception information by reading said exception information from said coprocessor.

23. The data processor as claimed in claim 22, wherein said main processor includes exception state saving means for saving in memory said exception state read from said coprocessor, and said exception state saving means includes means for synchronizing said coprocessor with said main processor such that said main processor does not process any further instructions until all instructions having been issued to the coprocessor are guaranteed to complete without causing a subsequent exception, disabling use of said coprocessor after said coprocessor is synchronized with said main processor, saving pending exception state of the disabled coprocessor into said memory, and clearing the pending exception state from the disabled coprocessor.

24. The data processor as claimed in claim 23, wherein said exception state saving means includes means for clearing coprocessor exception state information from a thread descriptor area of memory allocated to a currently executed code thread.

25. The data processor as claimed in claim 23, wherein said main processor includes exception state restoring means for synchronizing said coprocessor with said main processor such that said main processor does not process any further instructions until all instructions having been issued to the coprocessor are guaranteed to complete without causing a subsequent exception, disabling use of said coprocessor after said coprocessor is synchronized with said main processor, reporting any pending exception in said coprocessor to a code thread having generated the pending exception in said coprocessor, and restoring saved exception state in memory into a thread descriptor area of memory allocated to a code thread having generated said saved exception state in memory.

* * * * *

UNITED STATES PATENT AND TRADEMARK OFFICE
CERTIFICATE OF CORRECTION

PATENT NO. : 5,197,138
DATED : March 23, 1993
INVENTOR(S) : Steven O. Hobbs and Hai Huang It is certified that error appears in the above-indentified patent and that said Letters Patent is hereby corrected as shown below:

Column 16, line 49, after "managing" insert --the old--.

Column 33, line 66, change "have" to --having--.

Column 35, line 7, change "wherein the" to --wherein said--.

Column 38, line 66, change "form" to --from--.

Column 39, line 27, change "form" to --from--.

Column 39, line 61, change "tot he" to --to the--.

Column 40, line 12, change "and" to -said--.

Signed and Sealed this

Nineteenth Day of April, 1994

Attest:

BRUCE LEHMAN

Attesting Officer     Commissioner of Patents and Trademarks